United States Patent
Murayama et al.

(10) Patent No.: US 11,244,217 B2
(45) Date of Patent: Feb. 8, 2022

(54) PRINTING DEVICE READING INFORMATION FROM AND WRITING INFORMATION TO STORAGE ELEMENT PROVIDED ON TAPE

(71) Applicant: BROTHER KOGYO KABUSHIKI KAISHA, Nagoya (JP)

(72) Inventors: Kentaro Murayama, Kasugai (JP); Kohei Terada, Kiyosu (JP); Yuji Hayashi, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/814,582

(22) Filed: Mar. 10, 2020

(65) Prior Publication Data
US 2020/0293845 A1   Sep. 17, 2020

(30) Foreign Application Priority Data

Mar. 15, 2019  (JP) .............................. JP2019-048317

(51) Int. Cl.
*G06K 7/10* (2006.01)
*G06K 17/00* (2006.01)
(Continued)

(52) U.S. Cl.
CPC ............ *G06K 17/0025* (2013.01); *B41J 3/36* (2013.01); *B41J 3/4075* (2013.01); *G06K 19/0776* (2013.01); *G06K 19/07718* (2013.01)

(58) Field of Classification Search
CPC ......... G06K 17/0025; G06K 19/07718; G06K 19/0776; B41J 3/36; B41J 3/4075
See application file for complete search history.

(56) References Cited

U.S. PATENT DOCUMENTS

| | | | | |
|---|---|---|---|---|
| 7,992,791 B2* | 8/2011 | Fukui | ................ | G06K 17/0025 235/492 |
| 2005/0021172 A1* | 1/2005 | Winter | ................ | G06K 19/077 700/228 |

(Continued)

FOREIGN PATENT DOCUMENTS

| | | |
|---|---|---|
| EP | 2 033 793 A1 | 3/2009 |
| JP | 2005-128867 A | 5/2005 |

(Continued)

OTHER PUBLICATIONS

The extended European Search Report for the related European Patent Application No. 20162135.6 dated Jul. 15, 2020.

(Continued)

*Primary Examiner* — Munear T Akki
(74) *Attorney, Agent, or Firm* — Kenealy Vaidya LLP

(57) ABSTRACT

In a printing device, a supply portion is configured to convey a tape in its longitudinal direction. The tape includes: a plurality of labels arranged continuously in the longitudinal direction; and a plurality of storage elements provided on respective ones of the plurality of labels. A first storage element is provided on a first label and configured to store first authentication data. The second storage element is provided on a second label and configured to store second authentication data. A printing portion is configured to print on the plurality of labels. A controller is configured to perform: reading the first authentication data from the first storage element and the second authentication data from the second storage element by a reading portion; and determining whether the first authentication data is correlated to the second authentication data to meet an authentication condition.

13 Claims, 16 Drawing Sheets

(51) Int. Cl.
  *B41J 3/36* (2006.01)
  *B41J 3/407* (2006.01)
  *G06K 19/077* (2006.01)

(56) References Cited

U.S. PATENT DOCUMENTS

2006/0250252 A1    11/2006  Nagai et al.
2012/0081747 A1*   4/2012   Kobayashi ............. B41J 3/4075
                                                   358/1.15
2013/0285798 A1*   10/2013  Koike ................ G06K 7/10009
                                                   340/10.51

FOREIGN PATENT DOCUMENTS

| JP | 2007-296746 A | 11/2007 |
| JP | 2009-205339 A | 9/2009 |
| JP | 2010-198174 A | 9/2010 |
| JP | 2011-204011 A | 10/2011 |

OTHER PUBLICATIONS

The Communication pursuant to Article 94(3) EPC for the related European Patent Application No. 20162135.6 dated Nov. 11, 2021.

* cited by examiner

FIG. 9

| | No. 100 | | | No. 3 | | | No. 2 | | | No. 1 | |
|---|---|---|---|---|---|---|---|---|---|---|---|
| | ADDRESS B | ADDRESS A | | ADDRESS B | ADDRESS A | | ADDRESS B | ADDRESS A | | ADDRESS B | ADDRESS A |
| | 0000 | 3664 | | 9472 | 2448 | | 5936 | 1232 | | 9712 | 0016 |
| | 2019/1/17 155601_3664 | | | 2019/1/17 155555_2448 | | | 2019/1/17 155555_1232 | | | 2019/1/17 155555_0016 | |

CONVEYING DIRECTION →

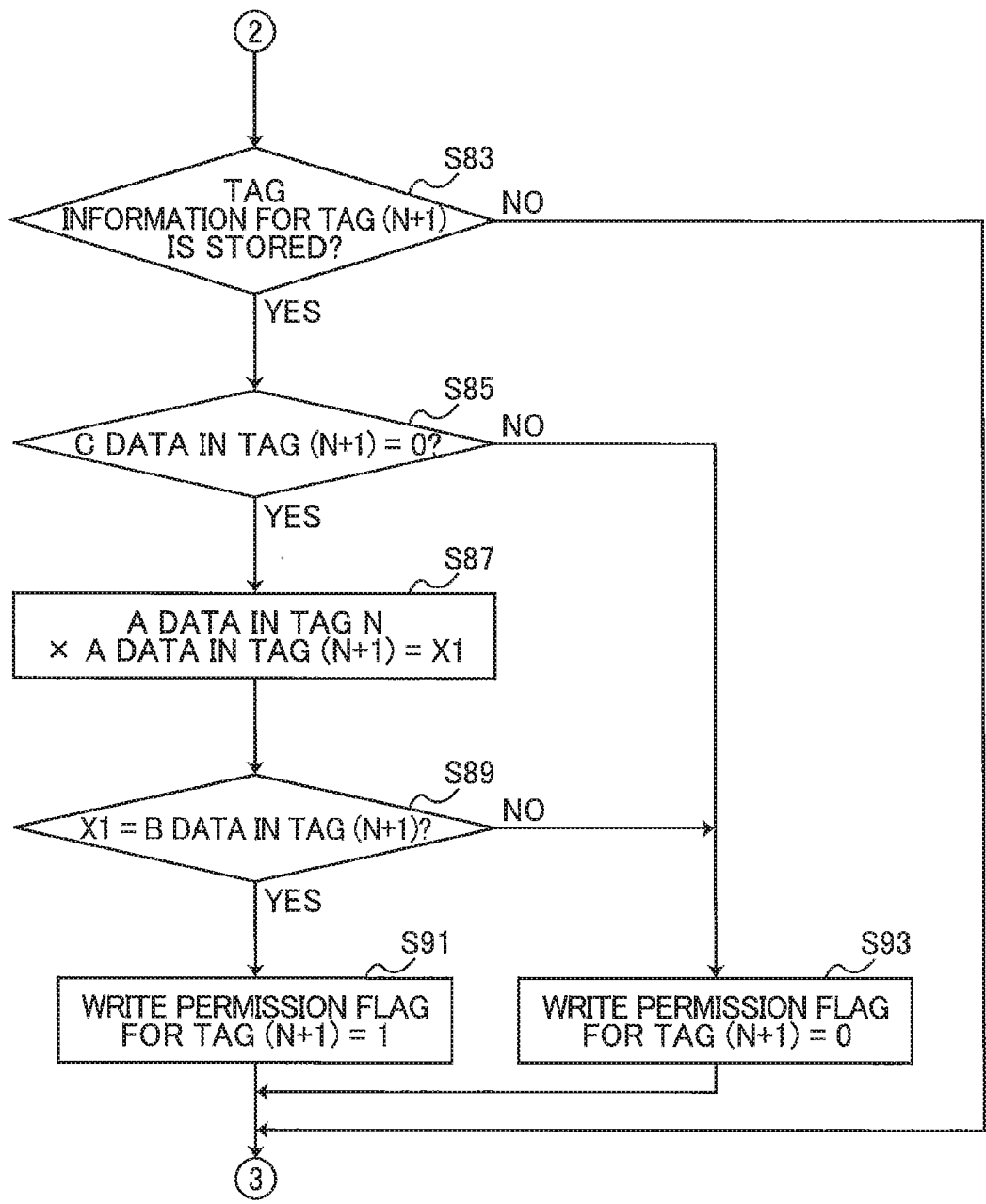

PRINTING DEVICE READING INFORMATION FROM AND WRITING INFORMATION TO STORAGE ELEMENT PROVIDED ON TAPE

CROSS REFERENCE TO RELATED APPLICATION

This application claims priority from Japanese Patent Application No. 2019-048317 filed Mar. 15, 2019. The entire content of the priority application is incorporated herein by reference.

TECHNICAL FIELD

The present disclosure relates to a printing device and a tape.

BACKGROUND

There are known in the art a tape provided with storage elements capable of storing information, and a printing device capable of reading information from and writing information to the storage elements provided on the tape through contactless communication. Japanese Patent Application Publication No. 2007-296746 provides an example of a radio frequency identification (RFID) inlet mounted on an RFID label paper. An RFID label printing device possessing printing means determines whether information read from the RFID inlet through contactless communication includes a type code for a type of RFID label paper that can be used in the RFID label printing device. The RFID label printing device does not perform a printing operation on the label paper with the printing means when determining that the information read from the RFID inlet does not include a type code for RFID label paper that can be used on the RFID label printing device.

SUMMARY

With the conventional printing device and tape described above, the printing device can not only read information from the storage element provided on the tape, but also write information to the storage element. However, it is desirable to prevent the printing device from performing unauthorized writing of information to the storaae element provided on the tape when the tape being used on the printing device is invalid.

Therefore, it is an object of the present disclosure to provide a printing device and a tape capable of preventing unauthorized writing of information to a storage element provided on a tape.

In order to attain the above and other objects, according to a first aspect of the present disclosure, there is provided a printing device including: a supply portion; a printing portion; a reading portion; and a controller. The supply portion is configured to convey a tape in a longitudinal direction thereof. The tape includes: a plurality of labels; and a plurality of storage elements. The plurality of labels is arranged continuously in the longitudinal direction. The plurality of labels includes a first label and a second label. The plurality of storage elements is provided on respective ones of the plurality of labels. Each of the plurality of storage elements is configured to store at least authentication data. The plurality of storage elements includes a first storage element provided on the first label and a second storage element provided on the second label. The first storage element is configured to store first authentication data. The second storage element is configured to store second authentication data. The printing portion is configured to print on the plurality of labels. The reading portion is configured to read the authentication data from each of the plurality of storage elements. The controller is configured to perform: (a) reading; and (b) determining. The (a) reading reads the first authentication data from the first storage element and the second authentication data from the second storage element by the reading portion. The (b) determining determines whether the first authentication data is correlated to the second authentication data to meet an authentication condition.

According to a second aspect of the present disclosure, there is provided a tape including: a plurality of labels; and a plurality of storage elements. The plurality of labels is arranged continuously in a longitudinal direction. The plurality of labels includes a first label and a second label neighboring the first label in the longitudinal direction. The plurality of storage elements is provided on respective ones of the plurality of labels. Each of the plurality of storage elements is provided with a first storage area and a second storage area. The first storage area is configured to store first data in advance. The second storage area is configured to store second data in advance. The plurality of storage elements includes a first storage element provided on the first label and a second storage element provided on the second label. The second data stored in the first storage element is equivalent to the first data stored in the second storage element.

According to a third aspect of the present disclosure, there is also provided a tape including: a plurality of labels; and a plurality of storage elements. The plurality of labels is arranged continuously in a longitudinal direction. The plurality of labels includes a first label, a second label, and a third label. The second label neighbors the first label in the longitudinal direction. The third label neighbors the first label on an opposite side of the second label in the longitudinal direction. The plurality of storage elements is provided on respective ones of the plurality of labels. Each of the plurality of storage elements is provided with a first storage area and a second storage area. The first storage area is configured to store first data in advance. The second storage area is configured to store second data in advance. The plurality of storage elements includes a first storage element, a second storage element, and a third storage element. The first storage element is provided on the first label. The second storage element is provided on the second label. The third storage element is provided on the third label. A first sequence of digits forms a first total value of the second data stored in the first storage element and the first data stored in the second storage element. A second sequence of digits forms a second total value of the first data stored in the first storage element and the second data stored in the third storage element. At least part of the first sequence of digits is identical to at least part of the second sequence of digits.

According to a fourth aspect of the present disclosure, there is also provided a tape including: a plurality of labels; and a plurality of storage elements. The plurality of labels is arranged continuously in a longitudinal direction. The plurality of labels includes a first label and a second label neighboring the first label in the longitudinal direction. The plurality of storage elements is provided on respective ones of the plurality of labels. Each of the plurality of storage elements being provided with a first storage area and a second storage area. The first storage area is configured to store authentication data in advance. The second storage area is configured to store a first key value in advance. The plurality of storage elements includes a first storage element provided on the first label and a second storage element provided on the second label. A first sequence of digits forms a first authentication value obtained by multiplying the authentication data stored in the first storage element and the authentication data stored in the second storage element. A second sequence of digits forms the first key value stored in the second storage element. At least part of the first sequence of digits includes at least part of the second sequence of digits.

BRIEF DESCRIPTION OF THE DRAWINGS

The particular features and advantages of the disclosure as well as other objects will become apparent from the fiAlowing description taken in connection with the accompanying drawings, in which:

FIG. 9 is a conceptual diagram of tag information stored in wireless communication tags provided on a tape according to a third embodiment of the present disclosure;

FIG. 16 is a flowchart illustrating the remainder of steps in the tag confirmation process executed by the CPU of the printing device according to the fifth embodiment.

DETAILED DESCRIPTION

Figure 1:
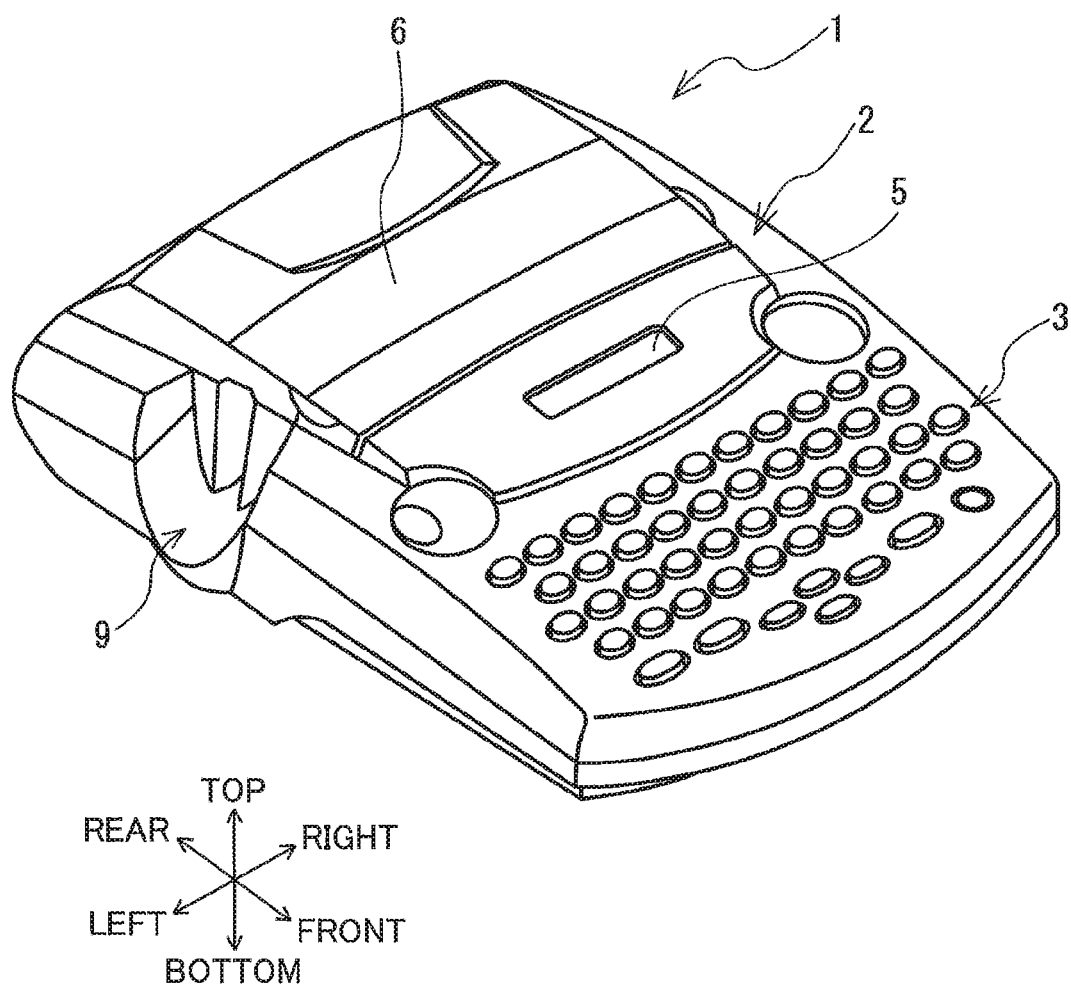
FIG. 1 is a perspective view of a printing device according to embodiments of a present disclosure.

Next, embodiments of the present disclosure will be described while referring to the accompanying drawings. The referenced drawings are used to describe the technical features made possible with the present disclosure. The configurations of the devices illustrated in the drawings are merely examples, and the present disclosure is not intended to be limited to these configurations. In the following description, the upper-right side, lower-left side, lower-right side, upper-left side, top side, and bottom side of a printing device 1 illustrated in FIG. 1 will be respectively defined as the right side, left side, front side, rear side, top side, and bottom side of the printing device 1. Further, the top side, bottom side, right side, and left side of a tape 50 illustrated in FIG. 4A will be respectively defined as the top side, bottom side, leading end, and trailing end of the tape 50.

As illustrated in FIG. 1, the printing device 1 is provided with a body cover 2. The body cover 2 is the housing of the printing device 1 and has a rectangular parallelepiped shape. A keyboard 3 for inputting characters is disposed on the top surface of the body cover 2 in the front portion thereof. The keyboard 3 includes a power switch, function keys, arrow keys, and the like. A display 5 is provided in the top surface of the body cover 2 to the rear side of the keyboard 3. The display 5 displays various information. The display 5 may be a dot matrix LCD, for example. A cassette cover 6 is provided on the rear side of the display 5. The cassette cover 6 can be opened and closed on the body cover 2. A discharge opening 9 is formed in the rear portion of the left side surface of the body cover 2. A printed section of the tape 50 is discharged from the body cover 2 through the discharge opening 9.

Figure 2:
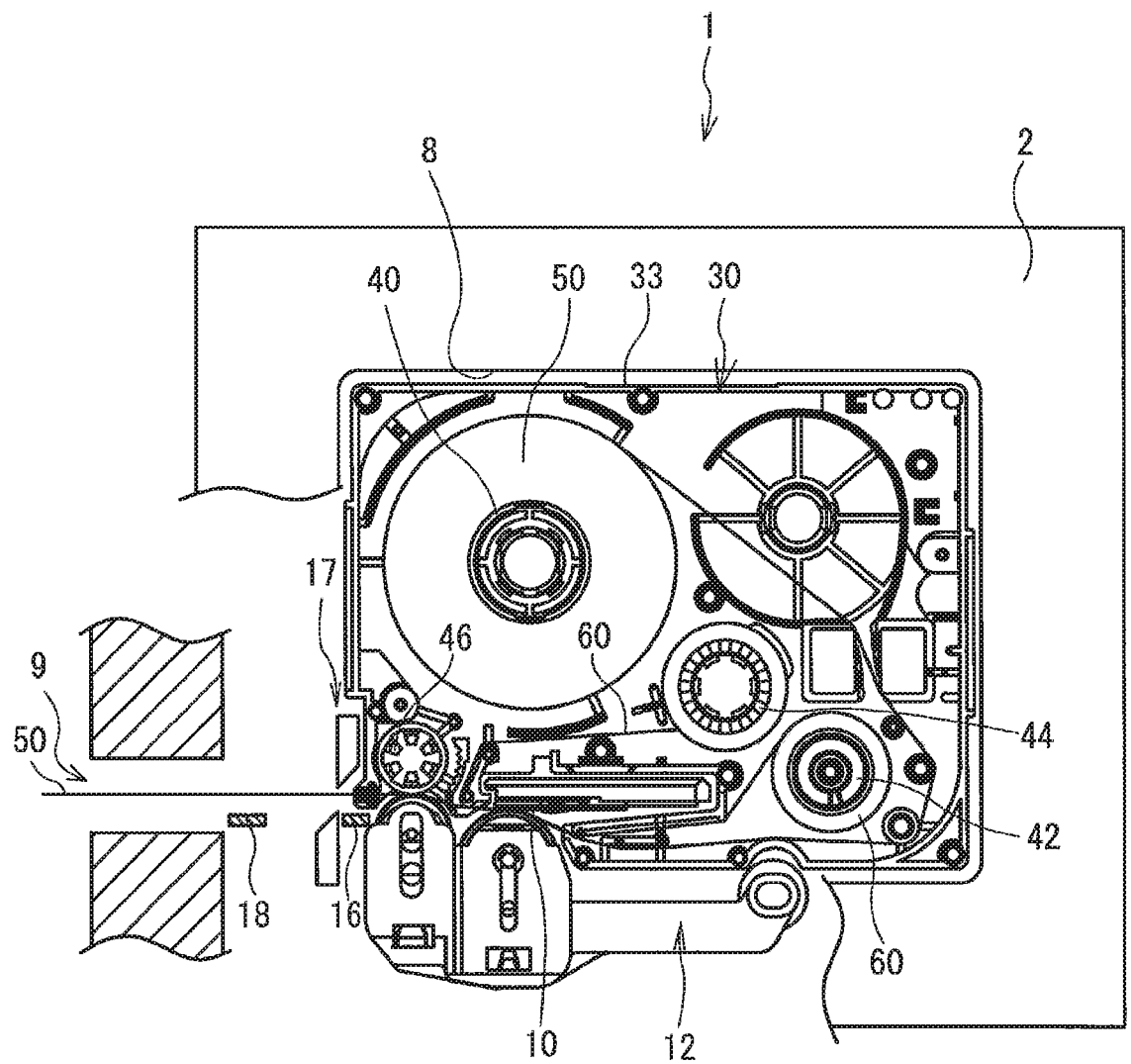
FIG. 2 is a plan view of a cassette mounting section of the printing device in which a tape cassette is mounted.

As illustrated in FIG. 2, a cassette mounting section 8 is provided inside the body cover 2 below the cassette cover 6 (see FIG. 1). The cassette mounting section 8 is a recessed part having a shape that corresponds to the shape or a tape cassette 30. Thus, when the cassette cover 6 is open, the tape cassette 30 can be mounted in or removed from the cassette mounting section 8. The printing device 1 prints characters inputted via the keyboard 3 using the tape cassette 30 mounted in the cassette mounting section 8.

The tape cassette 30 is provided with a box-shaped cassette case 33 for accommodating a tape 50, an ink ribbon 60, and the like. The unprinted tape 50 is wound around a tape spool 40. The tape spool 40 is rotatably supported in the left-rear section of the cassette case 33. The unused ink ribbon 60 is wound about a ribbon spool 42. The ribbon spool 42 is rotatably supported in the right-front section of the cassette case 33. A ribbon take-up spool 44 is rotatably supported in the cassette case 33 between the tape spool 40 and ribbon spool 42. The ribbon take-up spool 44 draws the unused ink ribbon 60 off the ribbon spool 42 and takes up the ink ribbon 60 after the ink ribbon 60 has been used for printing. A tape drive roller 46 is rotatably supported in the left-front corner of the cassette case 33. The tape drive roller 46 draws the tape 50 off the tape spool 40 to be printed and conveys the tape 50. The upstream side and downstream side in a conveying direction of the tape 50 correspond to the leading end side and trailing end side in a longitudinal direction of the tape 50, respectively.

Also provided in the cassette mounting section 8 are a ribbon take-up shaft (not illustrated), a tape drive shaft (not illustrated), a thermal head 10, a platen mechanism 12, a wireless communication reader 16, a wireless communication writer 18, and the like. The ribbon take-up shaft is inserted into the ribbon take-up spool 44 and is rotated by the drive of a tape feed motor 23 (see FIG. 3). The tape drive shaft is inserted into the tape drive roller 46 and is rotated through a transmission mechanism (not illustrated) by the drive of the tape feed motor 23. The thermal head 10 is disposed on the right side of the tape drive shaft. The thermal head 10 uses unused ink ribbon 60 to print on the tape 50 as the tape 50 is conveyed. The platen mechanism 12 presses the tape 50 and ink ribbon 60 against the thermal head 10 and conveys the tape 50 and ink ribbon 60. A cutting mechanism 17 is disposed between the discharge opening 9 and the cassette mounting section 8. The cutting mechanism 17 cuts the tape 50 at a prescribed position by the drive of a cutter motor 24 (see FIG. 3).

The wireless communication reader 16 is disposed on the upstream side of the cutting mechanism 17 in the conveying direction of the tape 50. The wireless communication reader 16 opposes the tape 50 discharged from the tape cassette 30 and is capable of reading data from a wireless communication tag 80 (see FIG. 4) on the tape 50 using near-field communication. The wireless communication writer 18 is disposed between the discharge opening 9 and the cutting mechanism 17. The wireless communication writer 18 opposes the tape 50 in the region between the discharge opening 9 and cutting mechanism 17 and is capable of writing data to the wireless communication tag 80 of the tape 50 using near-field communication. In the present embodiment, the wireless communication reader 16 is a well-known radio frequency identification (RFID) reader, and the wireless communication writer 18 is a well-known RFID writer. The distance between the wireless communication reader 16 and wireless communication writer 18 is preferably set larger than the interval between a plurality of wireless communication tags 80 (described later) arranged on the tape 50.

Figure 3:
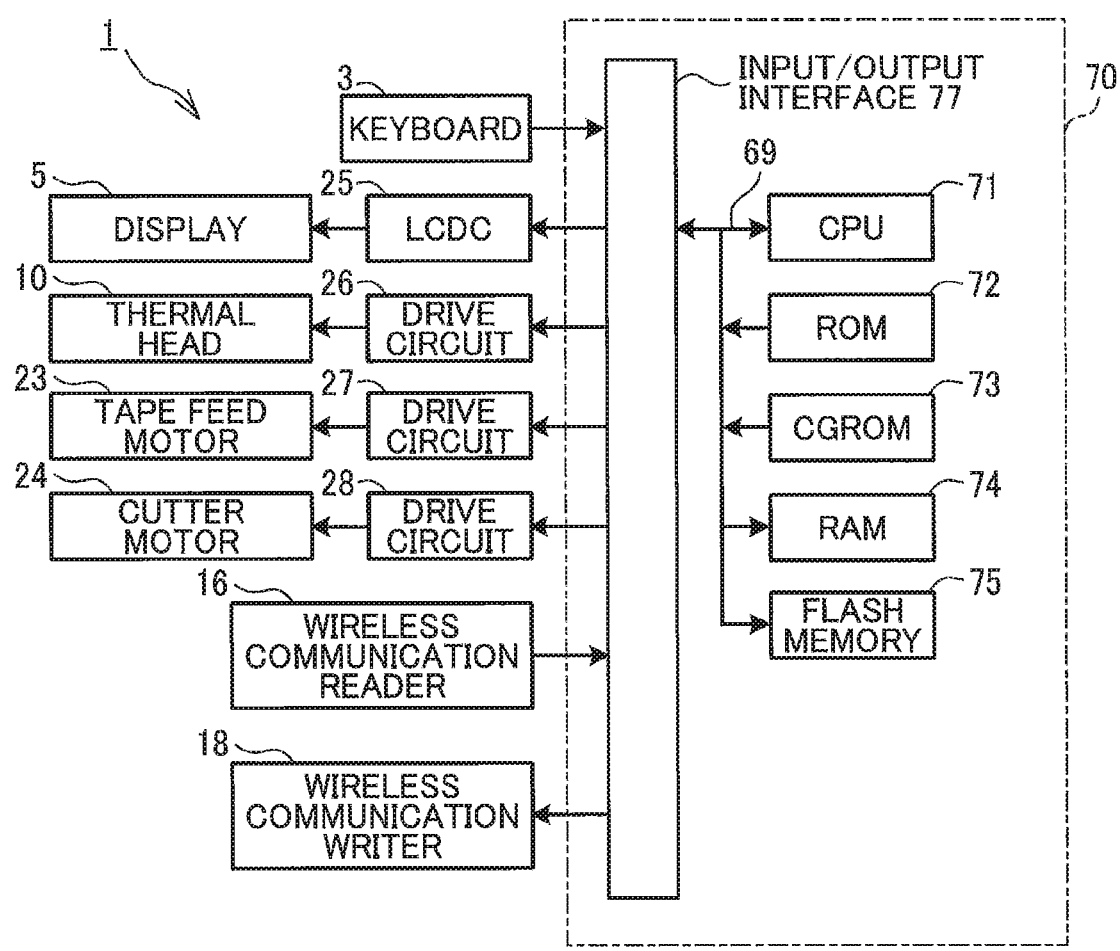
FIG. 3 is a block diagram illustrating the electrical configuration of the printing device according to the embodiments of the present disclosure.

Next, the electrical configuration of the printing device 1 will be described with reference to FIG. 3. The printing device 1 is provided with a control circuit unit 70. The control circuit unit 70 is provided with a central processing unit (CPU) 71, a read only memory (ROM) 72, a character generator ROM (CGROM) 73, a random access memory (RAM) 74, a flash memory 75, and an input/output interface 77, all of which components are connected via a data bus 69. The CPU 71 performs overall control of the printing device 1. The ROM 72 stores various parameters required when the CPU 71 executes various programs. The CGROM 73 stores image data representing characters to be printed on the tape 50. The RAM 74 includes a plurality of memory areas, such as a text memory, a print buffer, and the like. The flash memory 75 stores various programs that the CPU 71 executes, data read from the wireless communication tags 80, data to be written to the wireless communication tags 80, and the like.

The input/output interface 77 is connected to the keyboard 3, a liquid crystal drive circuit (LCDC) 25, drive circuits 26, 27, and 28, the wireless communication reader 16, and the wireless communication writer 18. The wireless communication reader 16 is provided with an antenna (not illustrated) and a reader IC (not illustrated) as is the case with a well-known RFID reader. The wireless communication writer 18 is provided with an antenna (not illustrated) and a writer IC (not illustrated) as is the case with a well-known RFID writer. The LCDC 25 has a video RAM (not illustrated) for outputting display data to the display 5. The drive circuit 26 is an electronic circuit for driving the thermal head 10. The drive circuit 27 is an electronic circuit for driving the tape feed motor 23. The drive circuit 28 is an electronic circuit for driving the cutter motor 24.

Next, an overview of the tape 50 will be given while referring to FIG. 4A. The tape 50 is a long strip-like sheet that includes a plurality of fixed-length labels 51 arranged continuously along the conveying direction. When the tape cassette 30 is mounted in the printing device 1, the tape 50 is conveyed along this longitudinal direction within the printing device 1. The thermal head 10 uses the ink ribbon 60 to print characters on one surface of the tape 50. The surface on which the thermal head 10 prints will be called the "printing surface." The cutting mechanism 17 cuts the tape 50 in units corresponding to the labels 51. A plurality of the wireless communication tags 80 is provided on the opposite side of the tape 50 from the printing surface. Data can be read from and written to the wireless communication tags 80 through wireless communications. The wireless communication tags 80 are arranged along the longitudinal direction of the tape 50.

The wireless communication tags 80 in the present embodiment are well-known RFID tags. Each wireless communication tag 80 has an IC chip 81, an antenna 82, and a sealing base material 83. The sealing base material 83 is a rectangular sheet. The IC chip 81 and antenna 82 are arranged on the surface of the sealing base material 83. The IC chip 81 is provided with a high-frequency circuit, a memory, and a power supply circuit. The antenna 82 is a coiled antenna wound around the IC chip 81 on the sealing base material 83. While the wireless communication tag 80 in the present embodiment is a passive RFID tag, an active RFID tag may be used instead.

The IC chip 81 has a plurality of storage areas capable of storing various information. In the present embodiment, a tag identification area 101, an address A area 102, an address B area 103, a supplemental information area 104, and the like are provided in the chip 81. The tag identification area 101 stores unique identification data for the corresponding wireless communication tag 80. The address A area 102 and address B area 103 store data used for authenticating the wireless communication tag 80. The address A area 102 and address B area 103 will be described later in greater detail. The supplemental information area 104 stores supplemental data, such as information about the tape cassette 30 (the type of tape, printing color, and tape width, for example), intbnnation related to the wireless communication tag 80, any information written by the user, and the like. The various information stored in the wireless communication tag 80 will be collectively called tag information 100.

In the present embodiment, an RFID writer (not illustrated) is used to write various information to the plurality of wireless communication tags 80 when manufacturing the tape 50. The information is written in order beginning from the wireless communication tag 80 arranged at the leading end side of the tape 50. At this time, ID data is written to the tag identification area 101 of each of the plurality of wireless communication tags 80. The ID data is assigned in ascending order beginning from the leading end of the tape 50 and continuing toward the trailing end. In FIG. 4B, the ID data written to each tag identification area 101 is illustrated with a word "No." added at the beginning. Valid data used for authenticating each wireless communication tag 80 is written to the corresponding address A area 102 and address B area 103. Supplemental data is written to the supplemental information area 104. The supplemental data specifies a unique manufacturing date and time (hours, minutes, and seconds precise to four decimal places) for the wireless communication tag 80.

In the present embodiment, the wireless communication tags 80 are arranged at regular intervals along the longitudinal direction of the tape 50 (i.e., the conveying direction) such that one wireless communication tag 80 is provided for each label 51. In FIG. 4A, the three labels 51 arranged on the tape 50 from the downstream end to the upstream side of the conveying direction will be called labels 51A, 51B, and 51C. The wireless communication tags 80 provided on the respective labels 51A, 51B, and 51C are called wireless communication tags 80A, 80B, and 80C. The tag information 100 stored on each of the wireless communication tags 80A, 80B, and 80C is respectively called tag information 100A, 100B, and 100C.

In the label 51A (wireless communication tag 80A) at the leading end of the tape 50, a "1" is stored in the tag identification area 101. This "1" is the smallest ID data. The ID data "2" is stored in the tag identification area 101 of the second label 51B (wireless communication tag 80B), and the ID data "3" is stored in the tag identification area 101 of the third label 51C (wireless communication tag 80C). As this ID data grows larger in the wireless communication tags 80A, 80B, and 80C, the supplemental data stored in the corresponding supplemental information area 104 indicates a later manufacturing date and time.

First Embodiment

Next, the tape 50 according to a first embodiment will be described in detail with reference to FIGS. 4A and 4B. In the following description, authentication data stored in the address A area 102 of the wireless communication tag 80 will be called A data, and authentication data stored in the address B area 103 of the wireless conununication tag 80 will be called B data. A data and B data are written to each wireless communication tag 80 in advance in conformance with the following rule.

The B data stored on the wireless communication tag 80 provided in a first label, where the first label is an arbitrary label 51, is the same as the A data stored in the wireless communication tag 80 provided on a second label neighboring the first label in the longitudinal direction (i.e., the conveying direction) of the tape 50. Similarly, the A data stored in the wireless communication tag 80 provided on the first label is equivalent to the B data stored in the wireless communication tag 80 provided on a third label neighboring the first label from the side of the first label opposite the second label.

The above rule will be described using the example illustrated in FIGS. 4A and 4B. In FIG. 4A, the label 51B will be the first label, the label 51C the second label, and the label 51A the third label. The wireless communication tags 80A through 80C provided on the third, first and second labels store the tag information 100A through 100C, respectively. In this example, as illustrated in FIG. 4B, both the B data in the tag information 100A and the A data in the tag information 100B are "0010". Similarly, the B data in the tag information 100B and the A data in the tag information 100C are also equivalent at "0011". In other words, the B data in an arbitrary label 51 is the same as the A data in the label 51 neighboring this arbitrary label 51 from the upstream side in the conveying direction (trailing end side in the longitudinal direction) of the tape 50 according to the first embodiment.

In the first embodiment, A data and B data should be calculated to satisfy the above rule and should be written to the corresponding address A areas 102 and address B areas 103 in the plurality of wireless communication tags 80 provided on the tape 50 when the tape 50 is being manufactured. It is preferable that the combination of A data and B data stored in any one of the plurality of wireless communication tags 80 differs from the combinations of A data and B data stored in all other wireless communication tags 80.

Next, a read/write control process according to the first embodiment will be described with reference to FIGS. 5 and 6. The printing device 1 executes the read/write control process in association with a process for conveying and printing the tape 50. The read/write control process is performed while a tape cassette 30 is mounted in the cassette mounting section 8 in order to read information from a wireless communication tag 80 and to write information to the wireless communication tag 80. The read/write control process includes a tag confirmation process (see FIG. 5), and a tag writing process (see FIG. 6). The CPU 71 of the printing device 1 executes these processes according to programs stored in the ROM 72 when the power to the printing device 1 is turned on.

Figure 5:
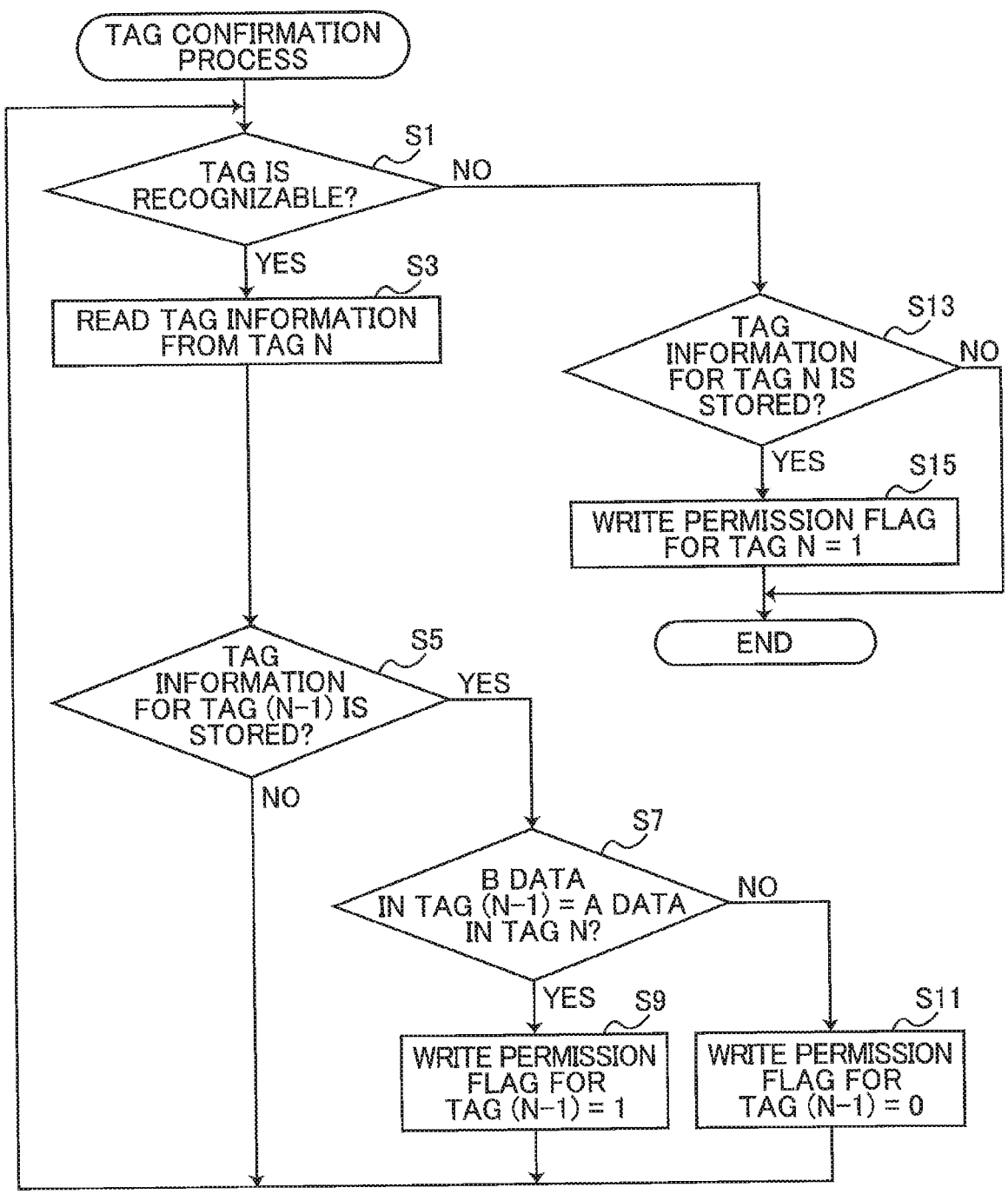
FIG. 5 is a flowchart illustrating steps in a tag confirmation process executed by a CPU of the printing device according to the first embodiment of the present disclosure.

As illustrated in FIG. 5, in S1 of the tag confirmation process according to the first embodiment, the CPU 71 first determines whether a wireless communication tag 80 is recognizable. The CPU 71 determines that a wireless communication tag 80 is recognizable, when the wireless communication reader 16 can detect a wireless communication tag 80 during the period that the tape 50 is conveyed a prescribed distance. When a wireless communication tag 80 is recognizable (S1: YES), in S3 the CPU 71 controls the wireless communication reader 16 to read tag information 100 from the wireless communication tag 80 detected in S1. Here, the wireless communication tag 80 detected in S1 will be called a tag N. The CPU 71 stores the tag information read from the tag N in the flash memory 75. The CPU 71 also stores a variable N in the flash memory 75 indicating the ID data read from the tag N. The variable N is set to correspond to the ID data read from the tag N in S3. The tag N is the most recent wireless communication tag 80 detected by the wireless communication reader 16, and the ID data stored in the tag identification area 101 of this wireless communication tag 80 will be called "N".

Figure 4A:
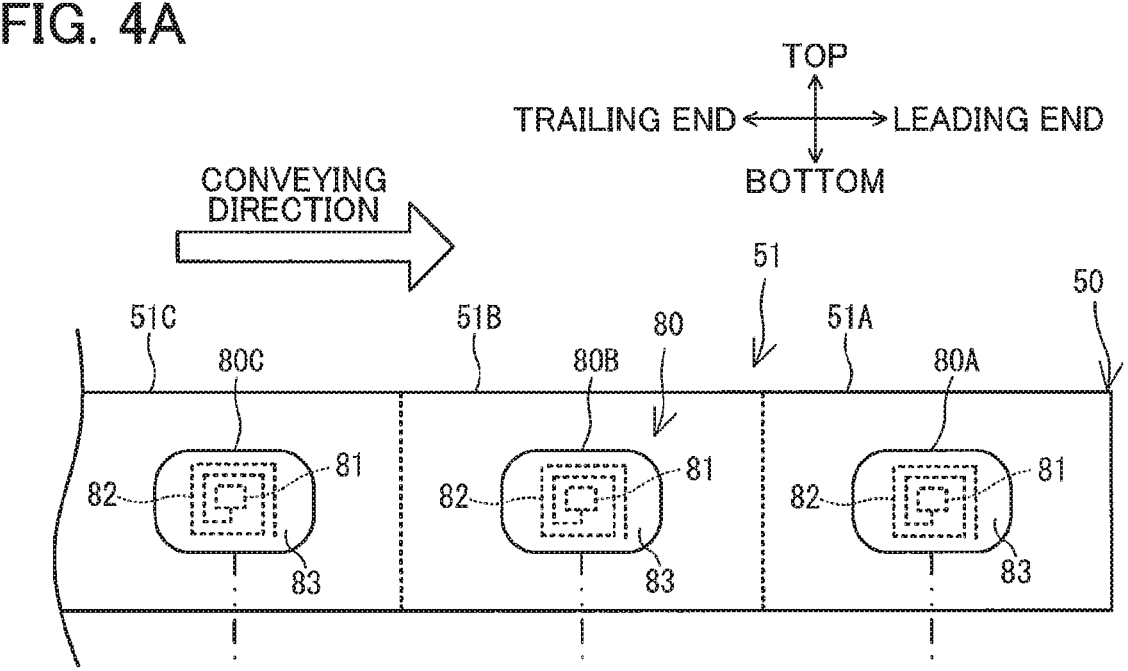
FIG. 4A is a plan view of a tape according to the embodiments of the present disclosure, in which a plurality of wireless communication tags provided on the tape is illustrated.
Figure 4B:
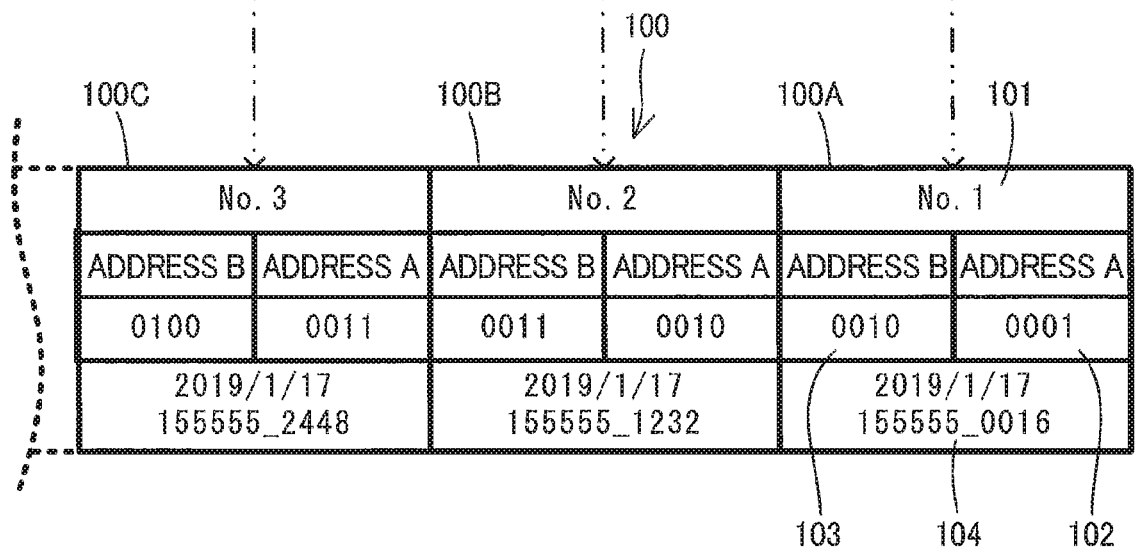
FIG. 4B is a conceptual diagram of tag information stored in the wireless communication tags provided on the tape according to a first embodiment of the present disclosure.

In the example illustrated in FIGS. 4A and 4B, the first wireless communication tag 80 detected by the wireless communication reader 16 immediately after the printing device 1 is turned on is the wireless communication tag 80A provided on the label 51A. Since the wireless communication tag 80A stores the ID data "1" in the tag identification area 101, the tag information 100 for tag "1" is stored in the flash memory 75 and the variable N is set to "1" (S3). As the tape 50 is conveyed thereafter, the tag information 100 is read from each wireless communication tag 80 in sequence and stored in the flash memory 75, and the variable N is updated to reflect the most recent ID data (S3). The variable N would be incremented by one from the latest value each time the tag information is read from a newly-detected wireless communication tag 80.

In S5 the CPU 71 determines whether the tag information 100 for tag (N−1) is stored in the flash memory 75. Tag (N−1) denotes the wireless communication tag 80 having ID data of a value obtained by subtracting one from variable N in the flash memory 75 (i.e., N−1). In other words, tag (N−1) denotes the wireless communication tag 80 read just prior to the latest tag N. In the example illustrated in FIGS. 4A and 4B, tag (N−1) immediately after power to the printing device 1 was turned on would correspond to a wireless communication tag 80 having the ID data "0", but a tag with the ID data "0" does not exist on the tape 50 (S5: NO). In this case, the CPU 71 returns to S1.

If tag information 100 in tag (N−1) exists in the flash memory 75 (S5: YES), in S7 the CPU 71 determines whether the B data in tag (N−1) is equivalent to the A data in tag N. Specifically, the CPU 71 determines whether the B data included in the tag information 100 stored in the flash memory 75 for tag (N−1) is the same as the A data included in the tag information 100 stored in the flash memory 75 for tag N.

If the B data in tag (N−1) is equivalent to the A data in tag N (S7: YES), tag (N−1) is considered to be a valid wireless communication tag 80. In S9 the CPU 71 stores a write permission flag in the flash memory 75 for tag (N−1) and sets the flag to "1". The write permission flag specifies whether information can be written to the corresponding wireless communication tag 80, with a "1" indicating that writing is permitted and a "0" indicating that writing is prohibited.

However, if the B data in tag (N−1) differs from the A data in tag N (S7: NO), tag (N−1) may be an invalid wireless communication tag 80. Accordingly, in S11 the CPU 71 stores a write permission flag in the flash memory 75 for tag (N−1) and sets this flag to "0". After completing step S9 or S11, the CPU 71 returns to S1. Each time the above process in S5 through S11 is executed, a write permission flag is stored in the flash memory 75 for the wireless communication tag 80 read just prior to the latest tag N.

Note that when the wireless communication reader 16 does not detect a wireless communication tag 80 (S1: NO), in S13 the CPU 71 determines whether the tag information for tag N is stored in the flash memory 75. Tag N denotes the wireless communication tag 80 having ID data of a value of variable N in the flash memory 74. In other words, tag N denotes the last detected wireless communication tag 80. If tag information 100 for tag N exists (S13: YES), the tag N whose tag information 100 was last read is considered the wireless communication tag 80 provided on the trailing end of the tape 50. Therefore, in S15 the CPU 71 sets the write permission flag for tag N to "1" in the flash memory 75 according to the same method described in S9. After completing S15 or if the tag information 100 for tag N does not exist in the flash memory 75 (S13: NO), the CPU 71 ends the tag confirmation process. Similarly, if a variable N is not stored in the flash memory 74 in S13, the CPU 71 ends the tag confirmation process.

Figure 6:
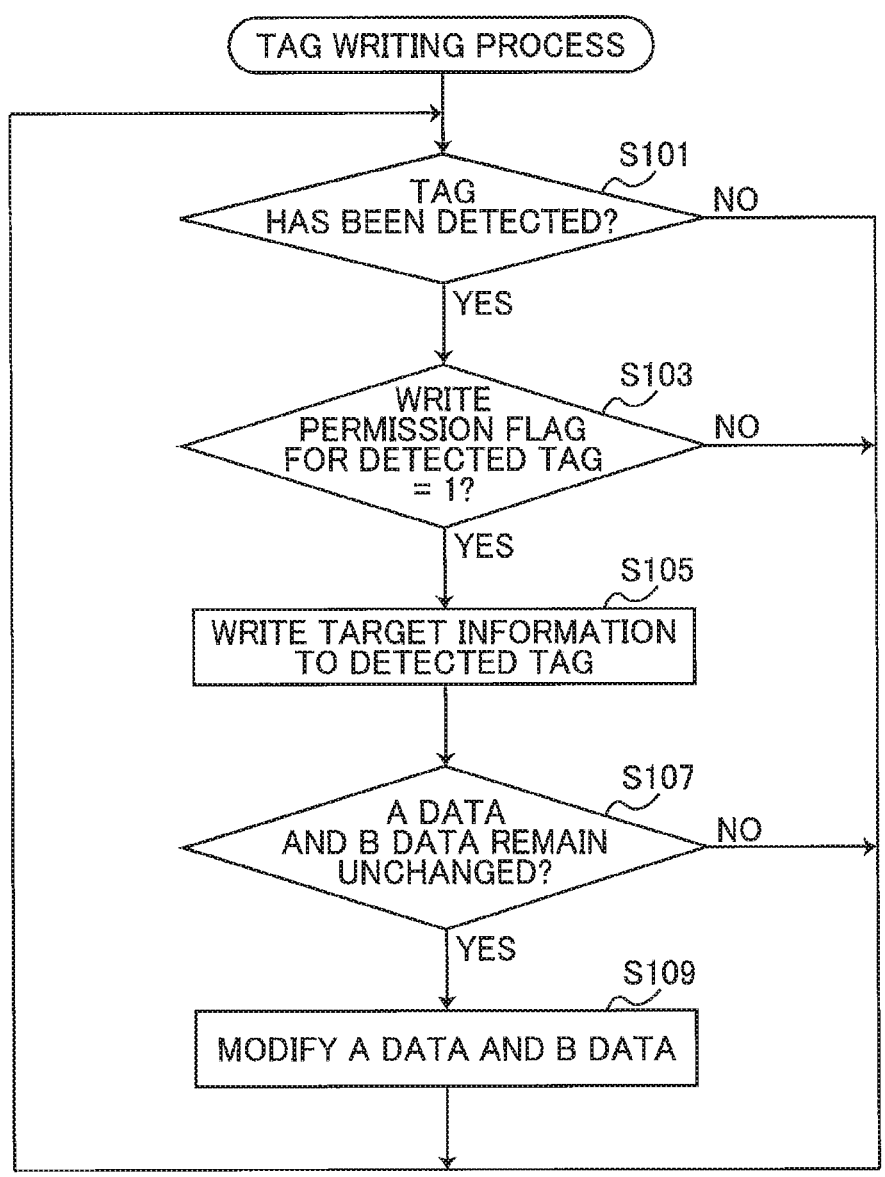
FIG. 6 is a flowchart illustrating steps in a tag writing process executed by the CPU of the printing device according to the first embodiment.

As illustrated in FIG. 6, in S101 of the tag writing process according to the first embodiment, the CPU 71 first determines whether a wireless communication tag 80 has been detected. The CPU 71 determines that a wireless communication tag 80 has been detected when the wireless communication writer 18 has detected one of the plurality of wireless communication tags 80 provided on the tape 50. If a wireless communication tag 80 has been detected (S101: YES), in S103 the CPU 71 determines whether the write permission flag for the detected wireless communication tag 80 (hereinafter called the detected tag) is "1". Specifically, the CPU 71 reads the ID data from the tag identification area 101 for the detected tag. The CPU 71 references the flash memory 75 to identify the write permission flag in the detected tag corresponding to the ID data read from the tag identification area 101 and determines whether the write permission flag is "1".

When the write permission flag in the detected tag is "1" (S103: YES), in S105 the CPU 71 reads target information from the flash memory 75 and writes the target information to the detected tag using the wireless communication writer 18. The target information is information to be written to the wireless communication tag 80. The user may have previously inputted this information via the keyboard 3 or the like, for example. Examples of target information are information specifying the creator or purpose of the label 51, and information about the product to which the label 51 will be affixed.

In S107 the CPU 71 determines whether the A data and B data stored in the detected tag remain unchanged by comparing the current data to the data prior to the execution of S105. If the A data and B data remain unchanged (S107: YES), in S109 the CPU 71 modifies the A data and B data in the detected tag. Specifically, the CPU 71 controls the wireless communication writer 18 to add a prescribed value ("1", for example) to the A data stored in the address A area 102 of the detected tag and to add a prescribed value ("1", for example) to the B data stored in the address B area 103 of the detected tag. By modifying A data and B data in the detected tag in this way, the CPU 71 can prevent invalid information updates to the detected tag.

After completing the process in S109, the CPU 71 returns to S101. The CPU 71 also returns to S101 when determining that a wireless communication tag 80 has not been detected (S1.01: NO), when determining that the write permission flag in the detected tag is not "1" (S103: NO), or when determining that one or both of the A data and B data in the detected tag has been modified (S107: NO).

Next, a specific example of the read/write control process according to the first embodiment will be described with reference to FIGS. 4A and 4B. In this example, the tag information 100A through 100C is sequentially read from labels 51A through 51C (the wireless communication tags 80A through 80C) by the wireless communication reader 16 as the tape 50 is conveyed during printing operations. At the timing that the tag information 100B is read, the variable N stored in the flash memory 75 is "2" (S1: YES, S3). In this case, the CPU 71 determines in S5 that both the B data in the tag information 100A and the A data in the tag information 100B are "0010". Since the data are equivalent (S5: YES, S7: YES), in S9 the CPU 71 sets the write permission flag in the wireless communication tag 80A to "1".

When the wireless communication writer 18 subsequently detects the wireless communication tag 80A, the write permission flag in the wireless communication tag 80A is "1". Accordingly, the wireless communication writer 18 is controlled to write target information to the wireless communication tag 80A (S101: YES, S103: YES, S105). If the A data and B data in the wireless communication tag 80A remain unchanged after step S105, the CPU 71 executes the process to modify the A data and B data (S107: YES, S109).

Second Embodiment

Figure 7:
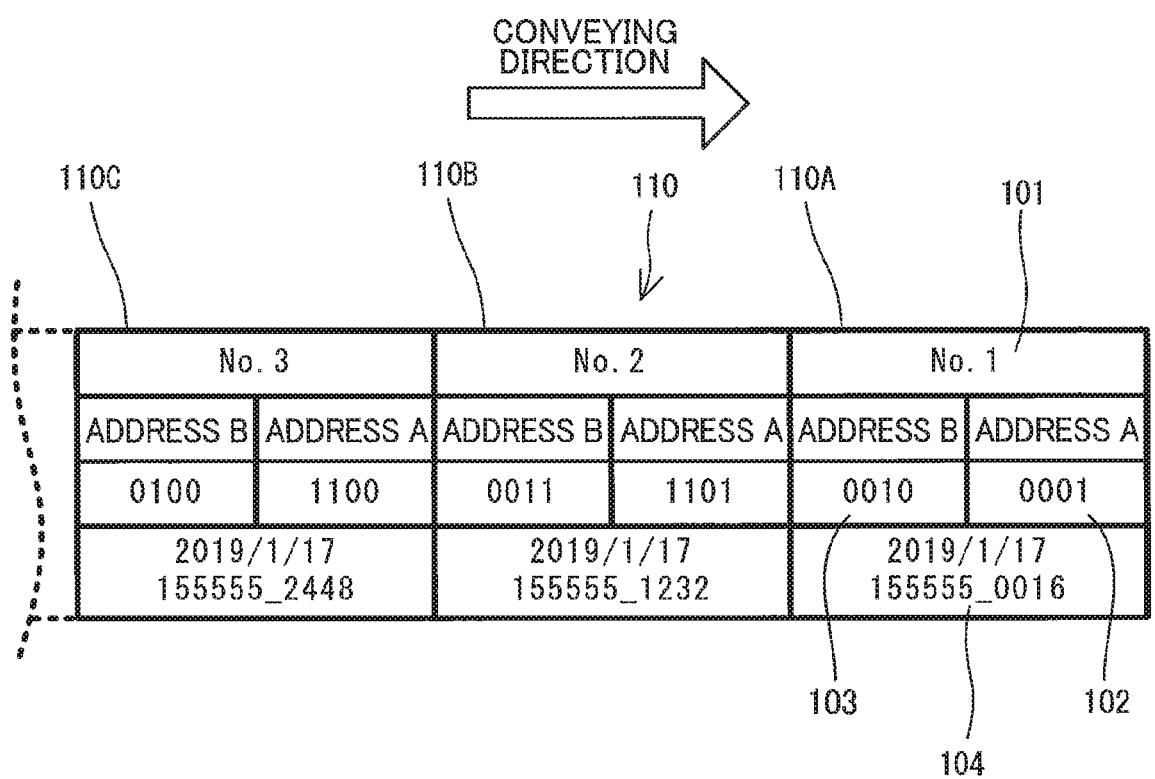
FIG. 7 is a conceptual diagram of tag information stored in wireless communication tags provided on a tape according to a second embodiment of the present disclosure.

Next, the tape 50 according to a second embodiment will be described with reference to FIG. 7. The tape 50 according to the second embodiment is similar to that in the first embodiment (see FIGS. 4A and 4B), but differs according to the rule by which A data and B data are written to the wireless communication tags 80 in advance. This rule is described below. Note that tag information 110 stored in each of the wireless communication tags 80A, 80B, and 80C will be respectively called tag information 110A, 110B, and 1100 in the second embodiment.

The plurality of labels 51 includes a first label, a second label, and a third label. The first label, second label, and third label constitute any three labels 51 that neighbor each other in the longitudinal direction (i.e., the conveying direction) of the tape 50, as described in the first embodiment. More specifically, in the present embodiment, the second label neighbors the first label in the longitudinal direction of the tape 50, and the third label neighbors the first label from the side opposite the second label.

At least part of the sum of B data stored in the wireless communication tag 80 provided on the first label and A data stored in the wireless communication tag 80 provided on the second label is equivalent to at least part of the sum of A data stored in the wireless communication tag 80 provided in the first label and B data stored in the wireless communication tag 80 provided on the third label. This will be described more in detail.

In the present embodiment, both A data and B data stored in each wireless communication tag 80 are composed of a plurality of digits. The sum (first sum) of B data stored in the wireless communication tag 80 provided on the first label and A data stored in the wireless communication tag 80 provided on the second label is also composed of a plurality of digits, and the sum (second sum) of A data stored in the wireless communication tag 80 provided on the first label and B data stored in the wireless communication tag 80 provided on the third label is also composed of a plurality of digits. In other words, a sequence of a plurality of digits (first sequence of digits) forms the first sum, and another sequence of a plurality of digits (second sequence of digits) forms the second sum. In the present embodiment, at least part of the first sequence of digits are respectively identical to at least part of the second sequence of digits. The first sum is an example of the first total value of the present disclosure, and the second sum is an example of the second total value of the present disclosure.

The above rule will be described using the example illustrated in FIGS. 4A and 7. In FIG. 4A the label 51B will be the first label, the label 51C the second label, and the label 51A the third label. The wireless communication tags 80A through 80C provided on the third, first, and second labels store the tag information 110A through 110C illustrated in FIG. 7. In this example, the sum of B data "0011" in the tag information 110B and A data "1100" in the tag information 110C will be called the first sum, and the sum of A data "1101" in the tag information 110B and B data "0010" in the tag information 110A will be called the second sum. The first sum and the second sum are both "1111" and, hence, are equivalent. In other words, all the digits that make up the first sum fully match all the digits that make up the second sum.

In the second embodiment, A data and B data should be calculated to satisfy the above rule and should be written to the corresponding address A areas 102 and address B areas 103 in the plurality of wireless communication tags 80 provided on the tape 50 when the tape 50 is being manufactured. It is preferable that the combination of A data and B data stored in any one of the plurality of wireless communication tags 80 differs from the combinations of A data and B data stored in all other wireless communication tags 80.

Next, the read/write control process according to the second embodiment will be described with reference to FIG. 8. The tag confirmation process of the second embodiment differs from that in the first embodiment (see FIG. 5) in that step S17 is executed in place of step S7. Hence, in S17 the CPU 71 determines whether the sum of B data in tag (N−1) and A data in tag N is equivalent to a prescribed value. Specifically, the CPU 71 calculates the sum of B data included in the tag information 110 stored in the flash memory 75 for tag (N−1) and A data included in the tag information 110 stored in the flash memory 75 for tag N. Next, the CPU 71 determines whether the calculated sum is equivalent to a prescribed value pre-stored in the ROM 72.

In S17 the CPU 71 may determine whether at least part of a sequence of digits forming the calculated sum are identical to at least part of a sequence of digits forming a prescribed value pre-stored in the ROM 72.

If the calculated sum is equivalent to the prescribed value (S17: YES), in S9 the CPU 71 sets the write permission flag for tag (N−1) to "1". If the calculated sum is not equivalent to the prescribed value (S17: NO), in S11 the CPU 71 sets the write permission flag for tag (N−1) to "0". The remainder of the tag confirmation process is identical to that in the first embodiment (see FIG. 5). The tag writing process according to the second embodiment is identical to that described in the first embodiment (see FIG. 6).

Next, a specific example of the read/write control process according to the second embodiment will be described with reference to FIGS. 4A and 7. In this example, the wireless communication reader 16 sequentially reads the tag information 110A through 110C from the labels 51A through 51C (the wireless communication tags 80A through 80C) while the tape 50 is being conveyed in a printing operation. At the timing after the tag information 110B was read, the variable N stored in the flash memory 75 is "2" (S1: YES, S3). In this case, the CPU 71 calculates the sum of the B data "0010" in the tag information 110A and the A data "1101" in the tag information 110B to be "1111". Since this sum is equivalent to the prescribed value "1111" pre-stored in the ROM 72 (S5: YES, S17: YES), the CPU 71 sets the write permission flag for the wireless communication tag 80A to "1" (S9). Thereafter, target information is written to the wireless communication tag 80A as described in the first embodiment.

Third Embodiment

Next, the tape 50 according to a third embodiment will be described with reference to FIG. 9. The tape 50 according to the third embodiment is similar to that in the first embodiment (see FIGS. 4A and 4B), but differs according to the rule by which A data and B data are written to the wireless communication tags 80 in advance. This rule is described below. Note that tag information 120 stored in each of the wireless communication tags 80A, 80B, and 80C will be respectively called tag information 120A, 120B, and 120C in the third embodiment. In addition, one hundred wireless communication tags 80 are provided on the tape 50 according to the third embodiment. The tag information 120 stored in the last wireless communication tag 80 provided on the trailing end side in the longitudinal direction of the tape 50 will be called tag information 1202.

A data stored in a wireless communication tag 80 provided in any label 51 among the plurality of labels 51 is equivalent to at least part of supplemental data stored in the wireless communication tag 80 of the same label 51. In other words, supplemental data stored in a supplemental information area 104 of each wireless communication tag 80 is composed of a plurality of digits, and A data stored in an address A area 102 of each wireless communication tag 80 is identical to at least part of a sequence of the digits forming the supplemental data stored in the supplemental information area 104 of the same wireless communication tag 80.

At least part of the product obtained by multiplying A data stored in a wireless communication tag 80 provided in any arbitrary first label among the plurality of labels 51 by A data stored in a wireless communication tag 80 provided on the second label neighboring the first label in the longitudinal direction of the tape 50 (i.e., the conveying direction) is equivalent to at least part of B data stored in the wireless communication tag 80 on the first label. In other words, the product obtained by multiplying the A data stored in the wireless communication tag 80 on the first label by the A data stored in the wireless communication tag 80 on the second label is formed by a sequence of digits (first sequence of digits). This sequence of digits includes at least part of a sequence of digits (second sequence of digits) forming B data stored in the wireless communication tag 80 on the first label.

Additionally, the labels 51 include a third label neighboring the first label on the side opposite the second label in the longitudinal direction. At least part of the product obtained by multiplying A data stored in the wireless communication tag 80 on the first label and A data stored in the wireless communication tag 80 on the third label is equivalent to at least part of the B data stored in the wireless communication tag on the third label. In other words, the product obtained by multiplying the A data stored in the wireless communication tag 80 on the first label by the A data stored in the wireless communication tag 80 on the third label is formed by a sequence of digits (third sequence of digits). This sequence of digits includes at least part of a sequence of digits (fourth sequence of digits) forming B data stored in the wireless communication tag 80 on the third label.

The above rule will be described using the example illustrated in FIGS. 4A and 9. In FIG. 4A, the label 51B will be the first label, the label 51C the second label, and the label 51A the third label. The wireless communication tags 80B, 80C, and 80A provided on the first through third labels respectively store the tag information 120B, 120C, and 120A illustrated in FIG. 9. In this example, the four digits of the A data "0016" in the tag information 120A are respectively identical to the last four digits "0016" of the supplemental data in the tag information 120A (the four digits to the right of the decimal for seconds). Similarly, the four digits of the A data "1232" in the tag information 120B are respectively identical to the last four digits "1232" of the supplemental data in the tag information 120B, and the four digits of the A data "2448" in the tag information 120C are respectively identical to the last four digits "2448" of the supplemental data in the tag information 120C.

In addition, the product of the A data "16" in the tag information 120A and the A data "1232" in the tag information 120B is a first product "19712". The last four digits of the first product are respectively identical to the B data "9712" in the tag information 120A. Further, the product of the A data in the tag information 120B and the A data in the tag information 120C is the second product "3015936". The last four digits of the second product are respectively equivalent to the B data "5936" in the tag information 120B.

In the third embodiment, A data and B data should be calculated to satisfy the above rule and should be written to the corresponding address A areas 102 and address B areas 103 in the plurality of wireless communication tags 80 provided on the tape 50 when the tape 50 is being manufactured. Specifically, the supplemental data should be written to the supplemental information area 104 and at least part of this supplemental data (the last four digits in this example) should be written to the address A area 102 while the tape 50 is being manufactured. Further, at least part of the product of A data in any two neighboring wireless communication tags 80 (the last four digits in this example) should be written to the address B area 103 in the wireless communication tag 80 provided on the leading end side in the longitudinal direction (i.e., on the downstream side in the conveying direction) of the tape 50. In the example of FIG. 9, the value "0" is written as an end marker to the address B area 103 of the tag information 120Z stored in the last wireless communication tag 80.

Next, the read/write control process according to the third embodiment will be described with reference to FIG. 10. The tag confirmation process of the third embodiment differs from that in the first embodiment (see FIG. 5) in that step S27 is executed in place of step S7. Hence, in S27 the CPU 71 determines whether the product of the A data in tag (N−1) and the A data in tag N is equivalent to the B data in tag (N−1). Specifically, the CPU 71 calculates the product of A data included in the tag information 120 stored in the flash memory 75 for tag (N−1) and A data included in the tag information 120 stored in the flash memory 75 for tag N. Next, the CPU 71 determines whether at least part of the calculated product is equivalent to the B data included in the tag information 120 for tag (N−1). In other words, the CPU 71 determines whether the B data included in the tag information 120 for tag (N−1) is identical to part of a sequence of digits forming the calculated product.

If the calculated product is equivalent to the B data in tag (N−1) (S27: YES), in S9 the CPU 71 sets the write permission flag for tag (N−1) to "1". Here, the expression "the calculated product is equivalent to the B data in tag (N−1)" means that at least part of a sequence of digits forming the calculated product are respectively identical to at least part of the B data in tag (N−1). If the calculated product is not equivalent to the B data in tag (N−1) (S27: NO), in S11 the CPU 71 sets the write permission flag for tag (N−1) to "0". The remainder of the tag confirmation process is identical to that in the first embodiment (see FIG. 5). The tag writing process according to the third embodiment is identical to that in the first embodiment (see FIG. 6). Note that if the end marker "0" is read from the address B area 103 in S3, the CPU 71 may advance to S15 immediately after the write permission flag for tag (N−1) is set in S9 or S11.

Next, a specific example of the read/write control process according to the third embodiment will be described with reference to FIGS. 4A and 9. In this example, the wireless communication reader 16 sequentially reads the tag information 120A through 120C from the labels 51A through 51C (the wireless communication tags 80A through 80C) while the tape 50 is being conveyed in a printing operation. At the timing after the tag information 120B was read, the variable N stored in the flash memory 75 is "2" (S1: YES, S3). In this case, the CPU 71 calculates the product of the A data "16" in the tag information 120A and the A data "1232" in the tag information 120B to be "19712". The last four digits of this product are respectively equivalent to the B data "9712" in the tag information 120A (S5: YES, S27: YES). Accordingly, in S9 the CPU 71 sets the write permission flag for the wireless communication tag 80A to "1". Thereafter, target information is written to the wireless communication tag 80A, as described in the first embodiment.

Fourth Embodiment

Figure 11:
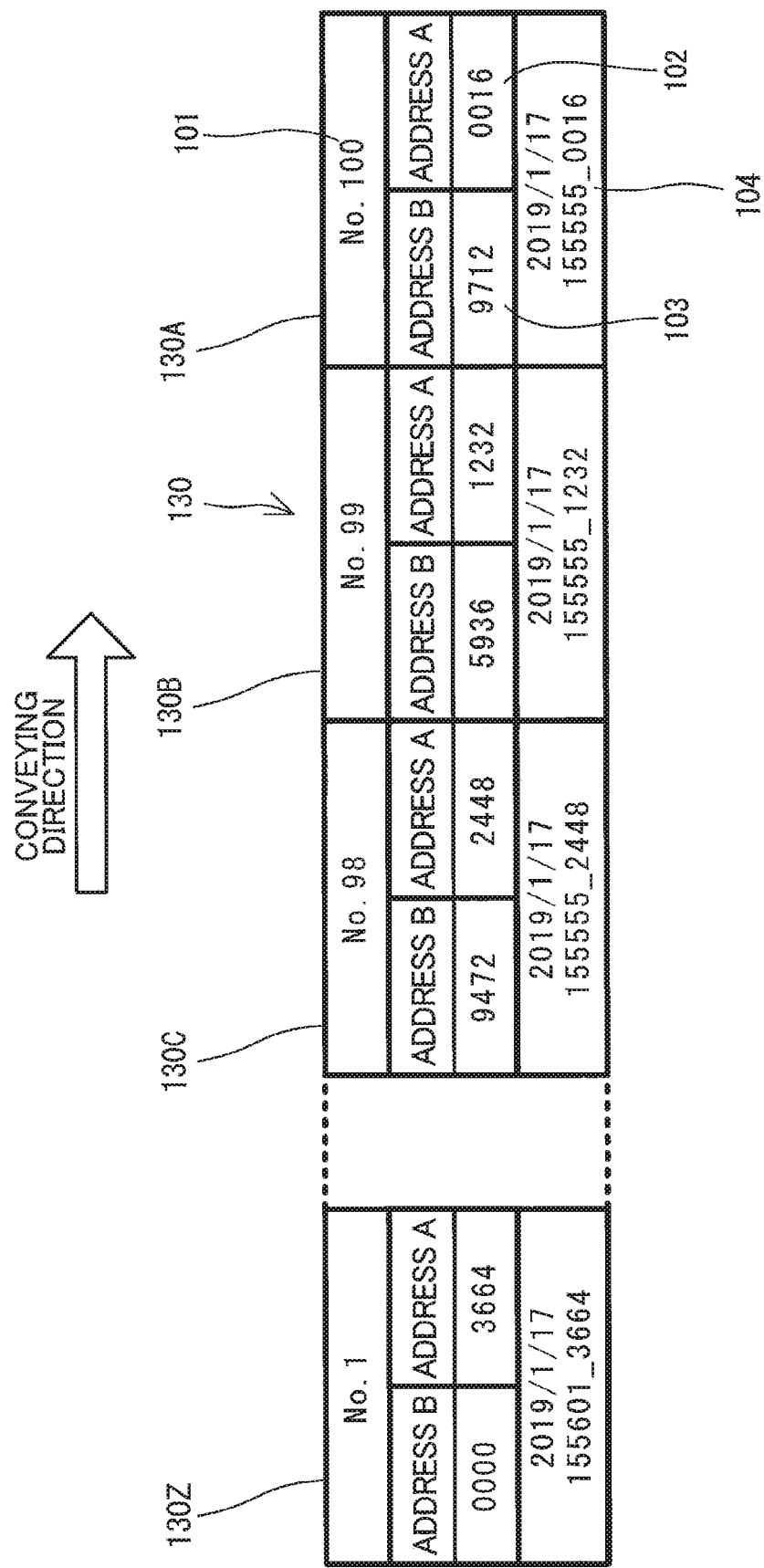
FIG. 11 is a conceptual diagram of tag information stored in wireless communication tags provided on a tape according to a fourth embodiment of the present disclosure.

Next, the tape 50 according to a fourth embodiment will be described with reference to FIG. 11. The tape 50 according to the fourth embodiment is similar to that in the first embodiment (see FIGS. 4A and 4B), but differs according to the following point. In the fourth embodiment, tag information 130 stored on each of the wireless communication tags 80A, 80B, and 80C will respectively be called tag information 130A, 130B, and 130C. Further, one hundred wireless communication tags 80 are provided on the tape 50 according to the fourth embodiment. The tag information 130 stored in the last wireless communication tag 80 will be called tag information 130Z.

Unlike the embodiments described above (see FIGS. 4A and 4B), when the tape 50 is manufactured according to the fourth embodiment, an RFID writer (not illustrated) writes various information to the plurality of wireless communication tags 80 in order, beginning from the wireless communication tag 80 disposed at the trailing end. At this time, ID data is written to the tag identification areas 101 of the plurality of wireless communication tags 80. The ID data is assigned in ascending order from the trailing end toward the leading end of the tape 50. Valid data used for authenticating each wireless communication tag 80 is written to the corresponding address A area 102 and address B area 103. Supplemental data is written to the supplemental information area 104. The supplemental data specifies a unique manufacturing date and time (hours, minutes, and seconds precise to four decimal places) for the wireless communication tag 80.

For example, the value "100", which is the largest ID data, is stored in the tag identification area 101 of the label 51A (the wireless communication tag 80A) at the leading end of the tape 50, The ID data "99" is stored in the tag identification area 101 of the label 51B (the wireless communication tag 80B), and the ID data "98" is stored in the tag identification area 101 of the label 51C (the wireless communication tag 80C). As the ID data grows smaller in the wireless communication tags 80A, 80B, and 80C, the supplemental data stored in the corresponding supplemental information area 104 indicates a later manufacturing date and time. In this example, "0" has been written as an end marker to the address B area 103 of the tag information 130Z that is stored in the last wireless communication tag 80.

In the tape 50 according to the fourth embodiment, k data and B data are written to the wireless communication tags 80 in advance in conformance with the same rule described in the third embodiment (see FIG. 9). In FIG. 4, the label 51B will be the first label, the label 51C the second label, and the label 51A the third label. In this example, the wireless communication tag 80B, wireless communication tag 80C, and wireless communication tag 80A provided on the first through third labels respectively store the tag information 130B, tag information 130C, and tag information 130A illustrated in FIG. 11. The A data and B data stored in the tag information 130A through 130C follow the same rule as in the third embodiment (the tag information 120A through 120C).

Next, the read/write control process according to the fourth embodiment will be described with reference to FIG. 12. In S31 of the tag confirmation process according to the fourth embodiment, the CPU 71 first determines whether a wireless communication tag 80 is recognizable, as in S1 of the first embodiment. If a wireless communication tag 80 can be recognized (S31: YES), in S33 the CPU 71 reads the tag information from a tag N, as described in S3 of the first embodiment.

In S35 the CPU 71 determines Whether the tag information 130 for tag (N+1) is stored in the flash memory 75. Tag (N+1) denotes the wireless communication tag 80 having ID data for the value obtained by adding one to the variable N in the flash memory 75 (i.e., N+1). In other words, tag (N+1) denotes the wireless communication tag 80 read just prior to the latest tag N. In the example illustrated in FIG. 11, tag (N+1) immediately after power to the printing device 1 was turned on corresponds to a wireless communication tag 80 having ID data "101", but a wireless communication tag 80 with the ID data "101" does not exist on the tape 50 (S35: NO). In this case, the CPU 71 returns to S31.

If tag information 130 for tag (N+1) exists in the flash memory 75 (S35: YES), in S37 the CPU 71 determines whether the product of the A data in tag (N+1) and the A data in tag N is equivalent to the B data in tag (N+1). Here, the expression "the product of A data in tag (N+1) and the A data in tag N is equivalent to the B data in tag (N+1)" means that at least part of a sequence of digits forming the product of A data in tag (N+1) and the A data in tag N are respectively identical to at least part of the B data in tag (N+1). If the calculated product is equivalent to the B data in tag (N+1) (S37: YES), in S39 the CPU 71 sets the write permission flag for tag (N+1) to "1" in the flash memory 75. If the calculated product is not equivalent to the B data for tag (N+1) (S37: NO), in S41 the CPU 71 sets the write permission flag for tag (N+1) to "0" in the flash memory 75. After completing step S39 or S41, the CPU 71 returns to S31.

When a wireless communication tag 80 cannot be recognized (S31: NO), in S43 the CPU 71 determines whether the tag information 130 for tag N exists in the flash memory 75. If the tag information 130 exists for tag N (S43: YES), in S45 the CPU 71 sets the write permission flag for tag N to "1". After executing the process in S45, when the tag information 130 for tag N does not exist in the flash memory 75, or a variable N is not stored in the flash memory 74 (S43: NO), the CPU 71 ends the tag confirmation process.

The tag writing process according to the fourth embodiment is identical to that in the first embodiment (see FIG. 6). In the tag confirmation process according to the fourth embodiment illustrated in FIG. 12, when the end marker "0" is read from the address B area 103 in S33, the CPU 71 may advance to S45 immediately after the write permission flag for tag (N−1) is set in S39 or S41.

Next, a specific example of the read/write control process according to the fourth embodiment will be described with reference to FIGS. 4A and 11. In this example, the wireless communication reader 16 sequentially reads the tag information 130A through 130C from the labels 51A through 51C (the wireless communication tags 80A through 80C) while the tape 50 is being conveyed in a printing operation. At the timing after the tag information 130B was read, the variable N stored in the flash memory 75 is "99" (S31: YES, S33). In this case, the CPU 71 calculates the product of the A data "16" in the tag information 130A and the A data "1232" in the tag information 130B to be "19712", The last four digits of this product are respectively identical to the B data "9712" in the tag information 130A (S35: YES, S37: YES). Accordingly, in S39 the CPU 71 sets the write permission flag for the wireless communication tag 80A to "1". Thereafter, target information is written to the wireless communication tag 80A, as described in the first embodiment.

Fifth Embodiment

Figure 13:
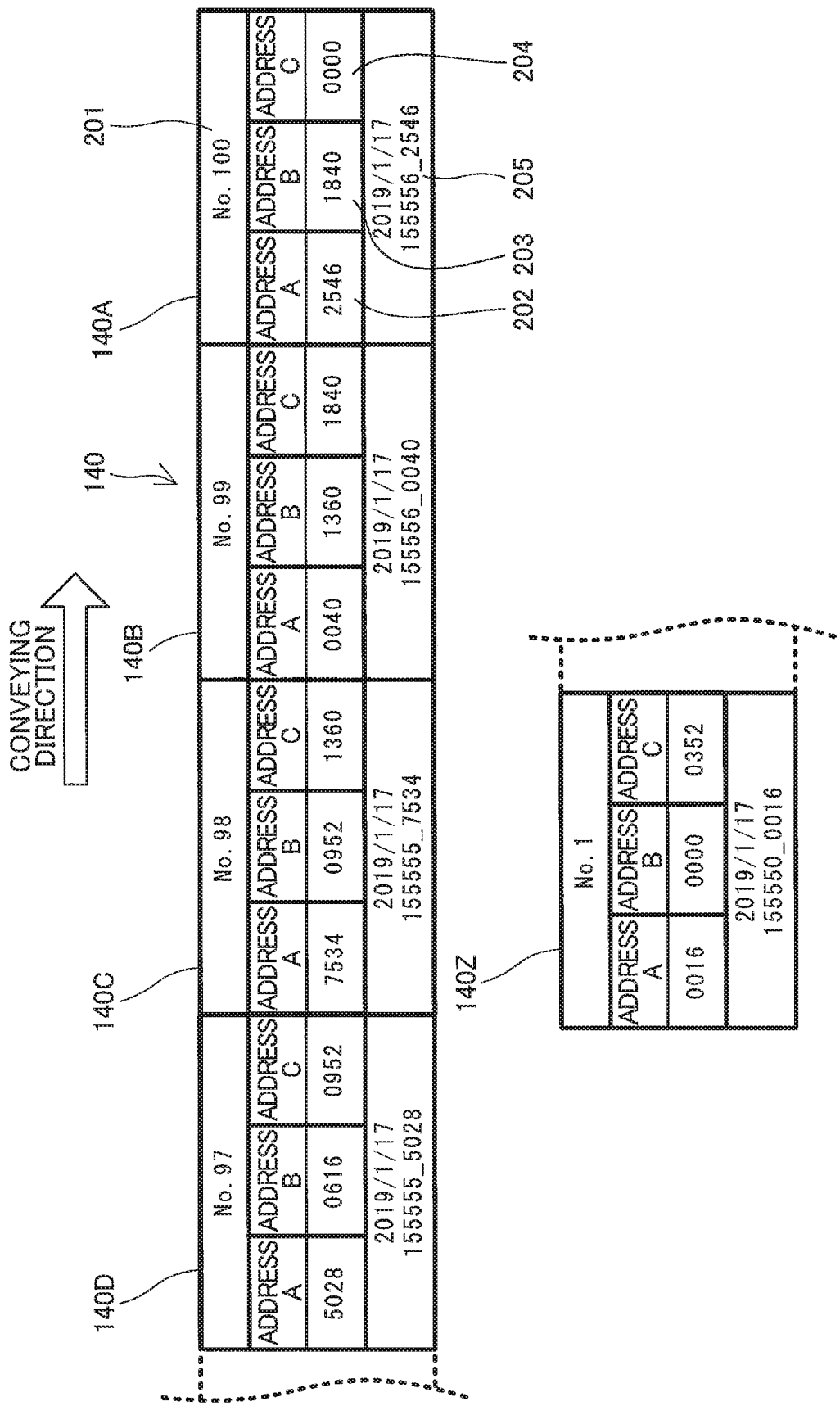
FIG. 13 is a conceptual diagram of tag information stored in wireless communication tags provided on a tape according to a fifth embodiment of the present disclosure.

Next, the tape 50 according to a fifth embodiment will be described with reference to FIG. 13. The tape 50 according to the fifth embodiment is similar to that in the first embodiment (see FIGS. 4A and 4B), but differs according to the following point. In the fifth embodiment, tag information 140 stored on each of the wireless communication tags 80A, 80B, and 80C will respectively be called tag information 140A, 140B, and 140C. Additionally, tag information 140 stored on the fourth wireless communication tag 80 on the upstream side of the wireless communication tag 80C in the conveying direction of the tape 50 will be called tag information 140D. Further, one hundred wireless communication tags 80 are provided on the tape 50 according to the fifth embodiment. The tag information 140 stored in the last wireless communication tag 80 will be called tag information 140Z.

In the fifth embodiment, a tag identification area 201, an address A area 202, an address B area 203, an address C area 204, a supplemental information area 205, and the like are provided in the IC chip 81. The tag identification area 201 and supplemental information area 205 are identical to the tag identification area 101 and supplemental information area 104 in the previous embodiments. The address A area 202, address B area 203, and address C area 204 store data used for authenticating the wireless communication tag 80. In the following description, the authentication data stored in the address A area 202 will be called A data; authentication data stored in the address B area 203 will be called B data; and authentication data stored in the address C area 204 will be called C data. The A data, B data, and C data are written to the wireless communication tag 80 in advance in conformance with the following rule.

At least part of the product obtained, by multiplying the A data stored in the wireless communication tag 80 provided in any arbitrary first label among the plurality of labels 51 by A data stored in the wireless communication tag 80 provided on the second label neighboring the first label in the longitudinal direction (i.e., the conveying direction) is equivalent to at least part of the B data stored in the wireless communication tag 80 of the first label and at least part of the C data stored in the wireless communication tag 80 of the second label. The labels 51 also include a third label that neighbors the first label in the longitudinal direction on the side opposite the second label. At least part of the product obtained by multiplying A data stored in the wireless communication tag 80 of the first label and A data stored in the wireless communication tag 80 of the third label is equivalent to at least part of the C data stored in the wireless communication tag 80 of the first label and at least part of the B data stored in the wireless communication tag 80 of the third label.

The above rule will be described using the example illustrated in FIGS. 4A and 13. In FIG. 4A, the label 51B will be the first label, the label 51C the second label, and the label 51A the third label. In this ease, the wireless communication tags 80B, 80C, and 80A provided on the first through third labels respectively store the tag information 140B, 140C, and 140A illustrated in FIG. 13. In this case, the product of the A data "40" in the tag information 140B, which is the thur digits ("0040") to the right of the decimal for seconds in supplemental data stored in the supplemental information area 205 of the same tag information 140B, and the A data "7534" in the tag information 140C, which is the four digits to the right of the decimal for seconds in supplemental data stored in the supplemental information area 205 of the same tag information 140C, is a first product "301360". The last four digits of the first product are respectively identical to the B data "1360" in the tag information 140B. Further, the product of the A data "40" in the tag information 140B, which is the four digits ("0040") to the right of the decimal for seconds in the supplemental data stored in the supplemental information area 205 of the same tag information 140B, and the A data "2546" in the tag information 140A, which is the four digits to the right of the decimal for seconds in supplemental data stored in the supplemental information area 205 of the same tag information 140A, is a second product "101840". The last four digits of the second product are respectively identical to the C data "1840" in the tag information 140B.

Note that last four digits of the first product are also respectively identical to the C data "1360" in the tag information 140C, and the last four digits of the second product are also respectively identical to the B data "1840" in the tag information 140A. The first product is an example of the first authentication value of the present disclosure, and the second product is an example of the second authentication value of the present disclosure.

In the fifth embodiment, as in the fourth embodiment described above (see FIG. 11), an RFID writer (not illustrated) writes various information to the plurality of wireless communication tags 80 in order, beginning from the wireless communication tag 80 disposed at the trailing end of the tape 50 when the tape 50 is being manufactured. At this time, A data, B data, and C data should be calculated to satisfy the above rule and should be written to the corresponding address A areas 202, address B areas 203, and address C areas 204 of the wireless communication tags 80 provided on the tape 50.

Specifically, the supplemental data should be written to the supplemental information area 205, and at least part of this supplemental data (the last four digits in this example) should be written to the address A area 202 as A data while the tape 50 is being manufactured. Further, at least part of the first product obtained by multiplying A data in two neighboring wireless communication tags 80 (the last four digits in this example) should be written to the address B area 203 in the wireless communication tag 80 on the leading end side in the longitudinal direction (on the downstream side of the conveying direction) of the tape 50 as B data. Similarly, at least part of the second product obtained by multiplying A data in two neighboring wireless communication tags 80 (the last four digits in this example) should be written to the address C area 204 in the wireless communication tag 80 on the trailing end side in the longitudinal direction (on the upstream side of the conveying direction) of the tape 50 as C data.

Note that a second label will not exist when the label 51 on the trailing end is the first label since no label 51 exists farther upstream from the first label in the conveying direction. In this case, the first product cannot be calculated because no A data is stored in the wireless communication tag 80 of a second label. In other words, B data to be written to the wireless communication tag 80 of the first label cannot be calculated. Therefore, in this example the value "0" is written as an end marker to the address B area 203 of the tag information 140Z stored in the last wireless communication tag 80.

In addition, a third label does not exist when the label 51A on the leading end of the tape 50 is the first label since a label 51 does not exist farther downstream than the first label in the conveying direction. In this case, the second product cannot be calculated because no A data is stored in the wireless communication tag 80 of a third label. In other words. C data to be written to the wireless communication tag 80 on the first label cannot be calculated. Therefore, in this example the value "0" is written as a start marker to the address C area 204 of the tag information 140A stored in the first wireless communication tag 80.

Next, the read/write control process according to the fifth embodiment will be described with reference to FIGS. 14 through 16. In S51 of the tag confirmation process according to the fifth embodiment, the CPU 71 first determines whether a wireless communication tag 80 is recognizable, as in S31 of the fourth embodiment. If a wireless communication tag 80 can be recognized (S51: YES), in S53 the CPU 71 reads the tag information 140 from a tag N, as described in S33 of the fourth embodiment.

In S55 the CPU 71 determines whether the tag information 140 for both tag (N+1) and tag (N+2) is stored in the flash memory 75. Tag (N+2) denotes the wireless communication tag 80 having ID data for the value obtained by adding two to the variable N in the flash memory 75 (i.e., N+2), In other words, tag (N+2) denotes the wireless communication tag 80 read two times prior to the latest tag N. If tag information 140 does not exist for both tag (N+1) and tag (N+2) (555: NO), the CPU 71 advances to S83. The process in S83 through S93 illustrated in FIG. 16 will be described later.

If tag information 140 does exist in the flash memory 75 for both tag (N+1) and tag (N+2) (S55: YES), in 557 the CPU 71 calculates a first product X1 by multiplying the A data in tag N by the A data in tag (N+1). In S59 the CPU 71 calculates a second product X2 by multiplying the A data in tag (N+1) by the A data in tag (N+2), In S61 the CPU 71 determines whether the first product X1 is equivalent to the B data in tag (N+1) and the second product X2 is equivalent to the C data in tag (N+1).

Here, the expression "the first product X1 is equivalent to the B data in tag (N+1)" means that at least part of a sequence of digits forming the first product X1 are respectively identical to at least part of the B data in tag (N+1), and the expression "the second product X2 is equivalent to the C data in tag (N+1)" means that at least part of a sequence of digits forming the second product X2 are respectively identical to at least part of the C data in tag (N+1). More specifically, in S71 the CPU 71 determines that the first product X1 is equivalent to the B data in tag (N+1) when the last four digits of the first product X1 fully match the B data in tag (N+1), and determines that the second product X2 is equivalent to the C data in tag (N+1) when the last four digits of the second product X2 fully match the C data in tag (N+1).

When the CPU 71 determines that the first product X1 is equivalent to the B data in tag (N+1) and the second product X2 is equivalent to the C data in tag (N+1) (S61: YES), in S63 the CPU 71 sets the write permission flag for tag (N+1) to "1" in the flash memory 75. However, if the first product X1 is not equivalent to the B data in tag (N+1) or if the second product X2 is not equivalent to the C data in tag (N+1) (S61: NO), in S65 the CPU 71 sets the write permission flag for tag (N+1) to "0" in the flash memory 75. After completing step S63 or S65, the CPU 71 returns to S51. Each time the above process in S55 through S65 is executed, a write permission flag is stored in the flash memory 75 for the wireless communication tag 80 read just prior to the latest tag N, i.e., the wireless communication tag 80 as tag (N+1).

If tag information 140 does not exist for both tag (N+1) and tag (N+2) (S55: NO), in S83 the CPU 71 determines whether the tag information for a tag (N+1) exists. If the tag information 140 for a tag (N+1) exists (S83: YES), the tag (N+1) whose tag information 140 was last read is considered the wireless communication tag 80 provided on the leading end of the tape 50. Therefore, in S85 the CPU 71 determines whether the C data in tag (N+1) is "0". Specifically, the CPU 71 determines whether a "0" is stored in the address C area 204 of the tag information 140 stored in the flash memory 75 for tag (N+1). If the C data for tag (N+1) is "0" (S85: YES), in S87 the CPU 71 calculates the first product X1 as described in S57. In other words, the CPU 71 calculates the first product X1 by multiplying the A data in tag N and A data in tag (N+1).

In S89 the CPU 71 determines whether the first product X1 is equivalent to the B data in tag (N+1). If the first product X1 is equivalent to the B data of tag (N+1) (S89: YES), tag (N+1) is considered to be a valid wireless communication tag 80. In S91 the CPU 71 sets the write permission flag for tag (N+1) to "1" in the flash memory 75. However, if the C data in tag (N+1) is not "0" (S85: NO) or if the first product X1 is not equivalent to the B data in tag (N+1) (S89: NO), tag (N+1) may not be a valid wireless communication tag 80. Thus, in S93 the CPU 71 sets the write permission flag for tag (N+1) to "0" in the flash memory 75. After completing step S91 or S93, or if the tag information 140 for a tag (N+1) does not exist (S83: NO), the CPU 71 returns to S51.

On the other hand, if a wireless communication tag 80 cannot be recognized (S51: NO), in S71 the CPU 71 determines whether the tag information 140 for a tag N exists. If the tag information 140 for a tag N exists (S71: YES), the tag N whose tag information 140 was last read is considered the wireless communication tag 80 provided on the trailing end of the tape 50. Therefore, in S73 the CPU 71 determines whether the B data in tag N is "0". Specifically, the CPU 71 determines whether a "0" is stored in the address B area 203 of the tag information 140 stored in the flash memory 75 for tag N. If the B data for tag N is "0" (S73: YES), in S75 the CPU 71 calculates the first product X1 as described in S57. In other words, the CPU 71 calculates the first product X1 by multiplying the A data in tag N and A data in tag (N+1).

In S77 the CPU 71 determines whether the first product X1 is equivalent to the C data in tag N. If the first product X1 is equivalent to the C data of tag N (S77: YES), tag N is considered to be a valid wireless communication tag 80. In S79 the CPU 71 sets the write permission flag for tag N to "1" in the flash memory 75. However, if the B data in tag N is not "0" (S73: NO) or if the first product X1 is not equivalent to the C data in tag N (S77: NO), tag N may not be a valid wireless communication tag 80. Thus, in S81 the CPU 71 sets the write permission flag for tag N to "0" in the flash memory 75. After completing step S79 or S81, or if the tag information 140 for a tag N does not exist (S71: NO), the CPU 71 ends the tag confirmation process.

Next, a specific example of the read/write control process according to the fifth embodiment will be described with reference to FIGS. 4A and 13. In this example, the wireless communication reader 16 sequentially reads the tag information 140A through 140C from the labels 51A through 51C (the wireless communication tags 80A through 80C) while the tape 50 is being conveyed in a printing operation. At the tuning after the tag information 140B was read, the variable N stored in the flash memory 75 is "99" (S51: YES, S53).

In this case, the tag information 140A is stored (S55: NO, S83: YES), and the value "101840" is calculated as the first product X1 in S87 by multiplying the A data "2546" in the tag information 140A by the A data "40" in the tag information 140B. Since the last four digits of the first product X1 are equivalent to the B data "1840" in the tag information 140A (S89: YES), in S91 the CPU 71 sets the write permission flag for the wireless communication tag 80A to "1". Thereafter, target information is written to the wireless communication tag 80A, as described in the first embodiment.

At the timing after the tag information 1400 was read, the variable N stored in the flash memory 75 is "98" (S51: YES, S53).

In this case, the value "301360" is calculated as the first product X1 in S57 by multiplying the A data "40" in the tag information 140B by the A data "7534" in the tag information 140C. The value "101840" is calculated as the second product X2 in S59 by multiplying the A data "40" in the tag information 140B by the A data "2546" in the tag information 140A. Since the last four digits of the first product X1 are equivalent to the B data "1360" in the tag information 140B and the last four digits of the second product X2 are equivalent to the C data "1840" in the tag information 140B (S61: YES), in S63 the CPU 71 sets the write permission flag for the wireless communication tag 80B to "1". Thereafter, target information is written to the wireless communication tag 80B, as described in the first embodiment.

REFERENCE

The printing device 1 according to the embodiments described above is provided with the tape feed motor 23, thermal head 10, wireless communication reader 16, wireless communication writer 18, and CPU 71. The tape feed motor 23 feeds the tape 50 along its longitudinal direction. The tape 50 has a plurality of labels 51 arranged along its longitudinal direction. Each label 51 is provided with a wireless communication tag 80 that stores at least authentication data (A data, B data, and C data, for example). The thermal head 10 prints on the labels 51 of the tape 50 fed by the tape feed motor 23. The wireless communication reader 16 reads information from the wireless communication tags 80 provided in the labels 51 of the tape 50.

Figure 8:
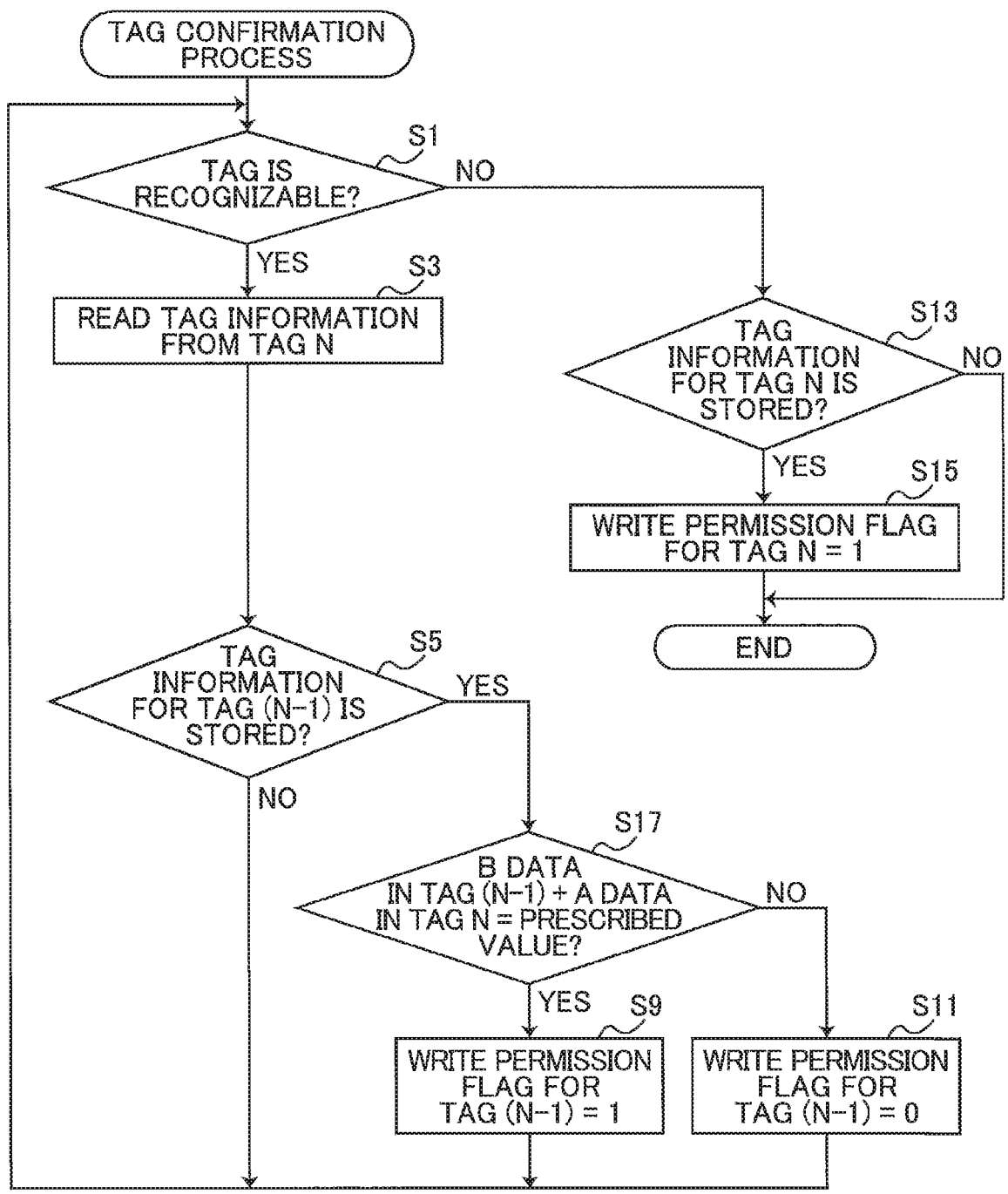
FIG. 8 is a flowchart illustrating steps in a tag confirmation process executed by a CPU of a printing device according to the second embodiment.
Figure 10:
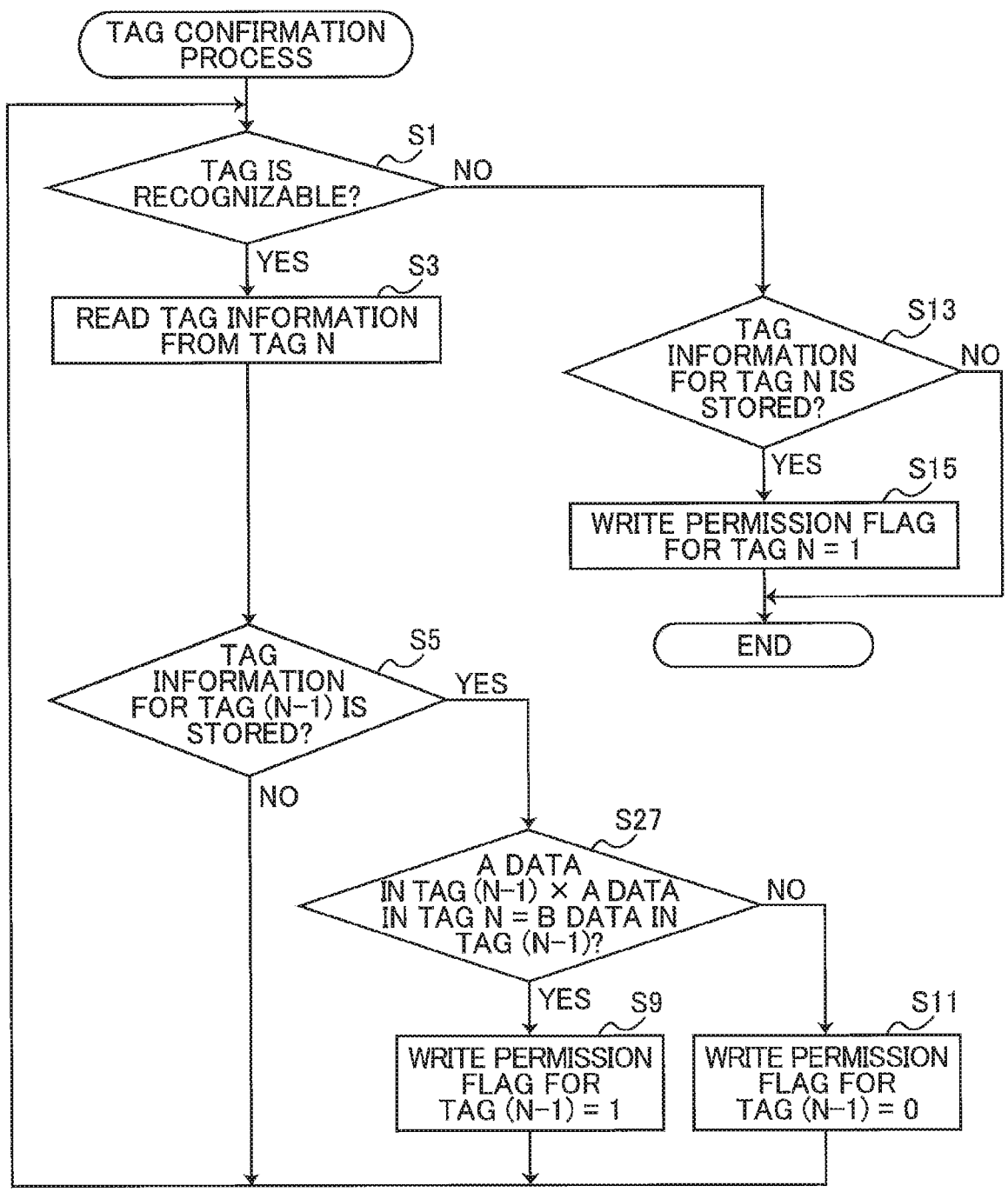
FIG. 10 is a flowchart illustrating steps in a tag confirmation process executed by a CPU of a printing device according to the third embodiment.
Figure 12:
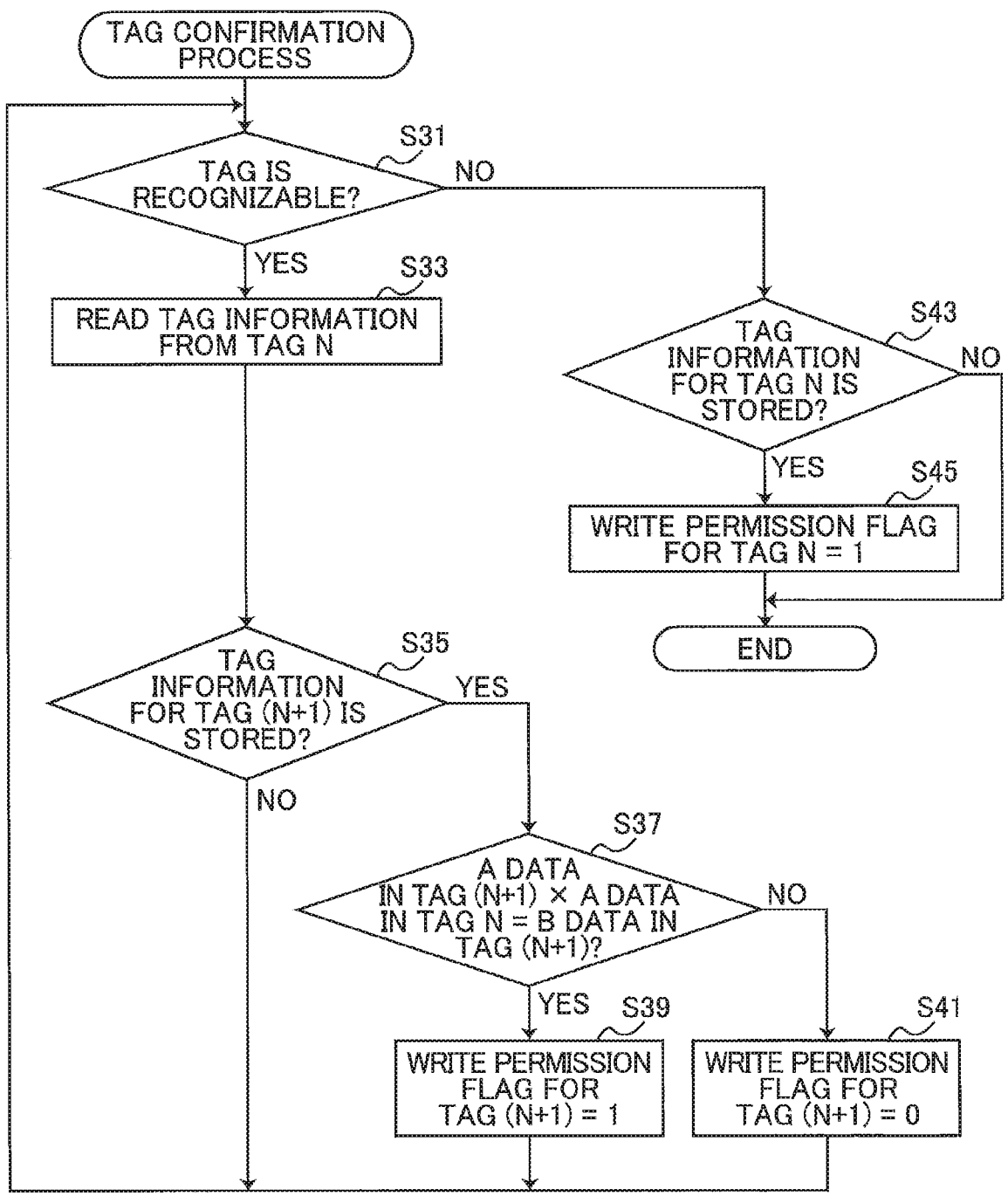
FIG. 12 is a flowchart illustrating steps in a tag confirmation process executed by a CPU of a printing device according to the fourth embodiment.
Figure 14:
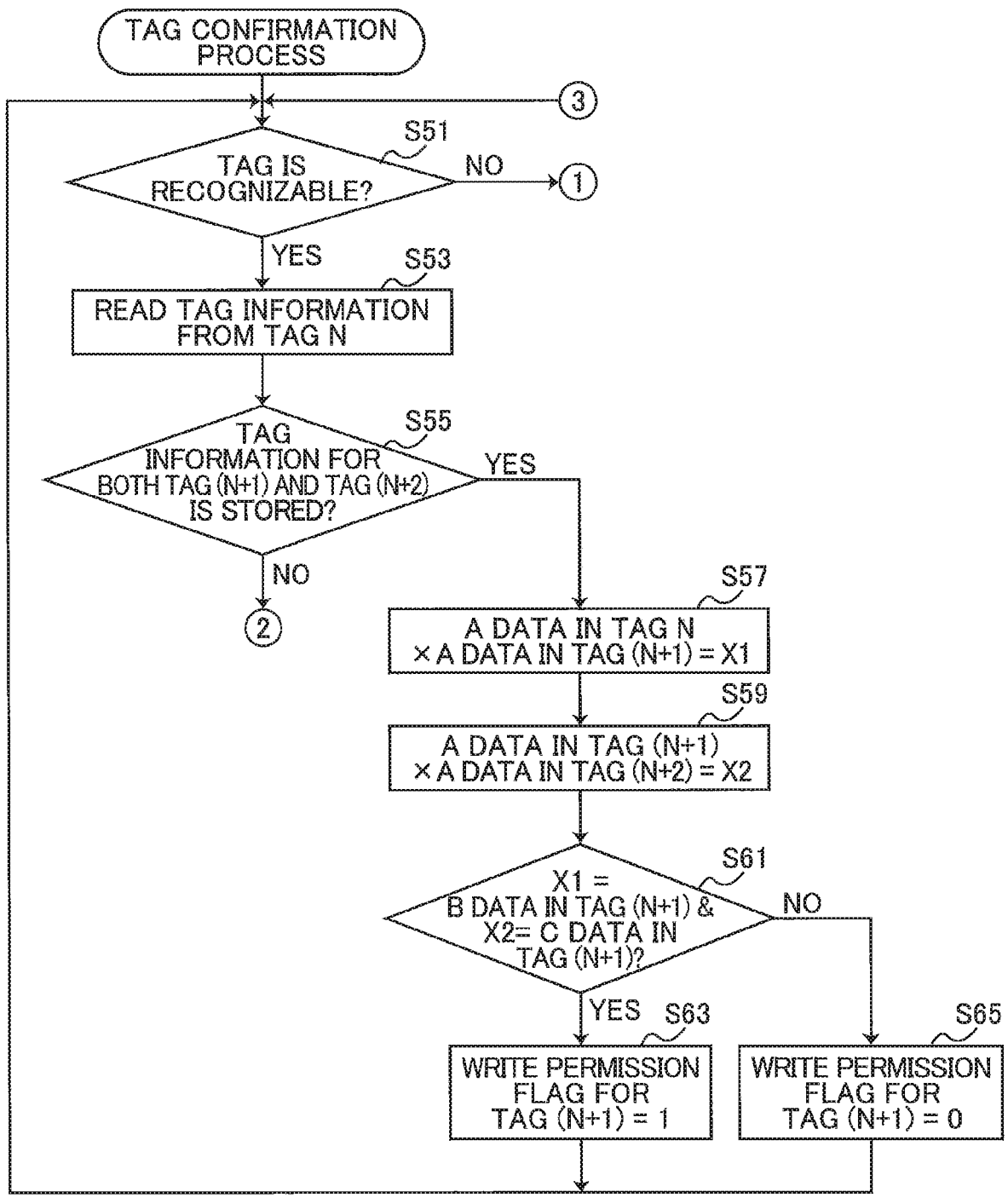
FIG. 14 is a flowchart illustrating part of steps in a tag confirmation process executed by a CPU of a printing device according to the fifth embodiment.
Figure 15:
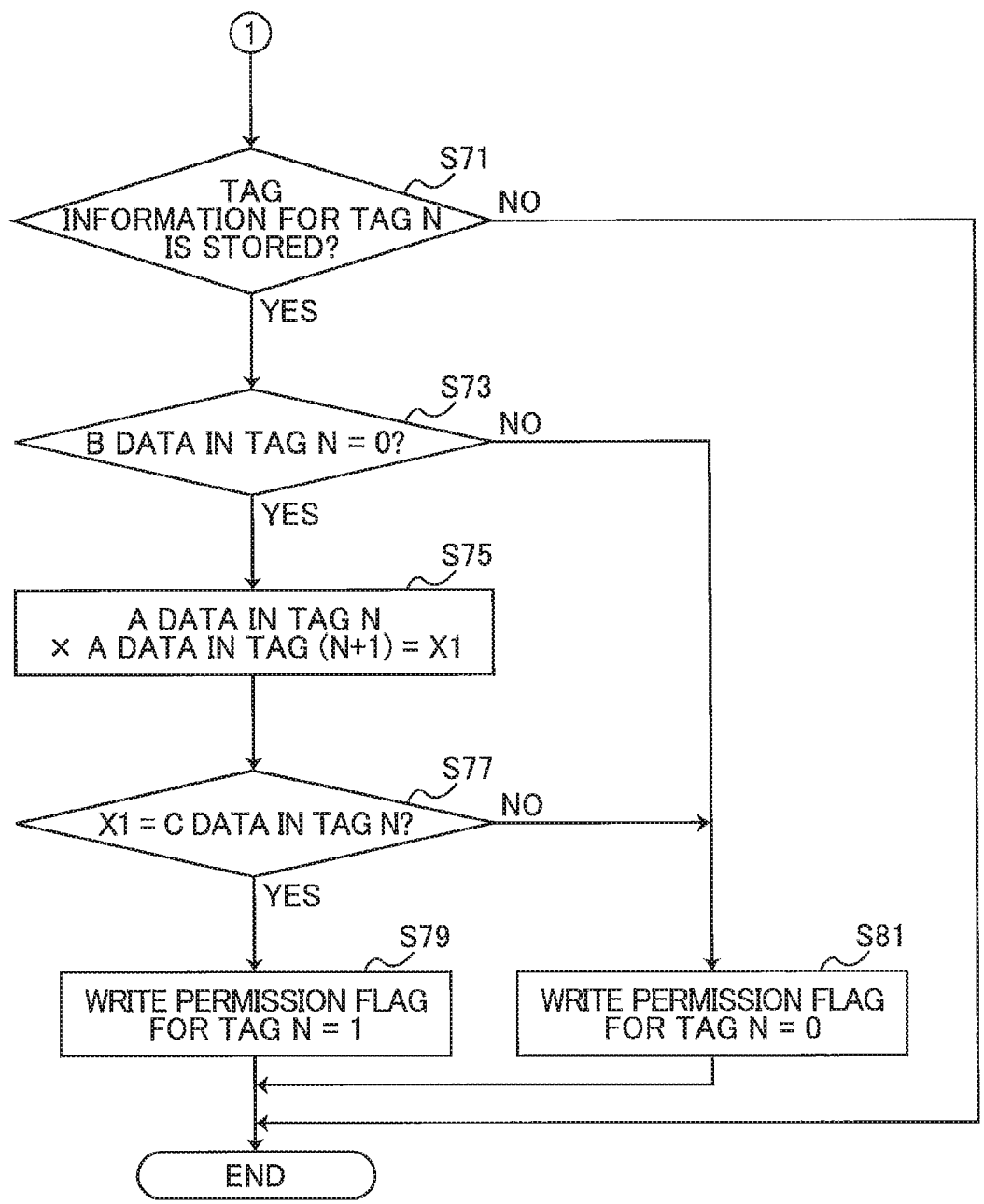
FIG. 15 is a flowchart illustrating another part of steps in the tag confirmation process executed by the CPU of the printing device according to the fifth embodiment.

The CPU 71 controls the wireless communication reader 16 to read first authentication data and second authentication data (S3 of FIGS. 5, 8, and 10, S33 of FIG. 12, S53 of FIG. 14). The first authentication data is stored in the wireless communication tag 80 provided on a first label, and the second authentication data is stored in the wireless communication tag 80 provided on a second label. The CPU 71 determines whether the first authentication data and second authentication data read by the wireless communication reader 16 satisfy an authentication condition (S7 of FIG. 5, S17 of FIG. 8, S27 of FIG. 10, S37 of FIG. 12, S61 of FIG. 14). The authentication condition is a predetermined relationship between the first authentication data and second authentication data.

Through this process, the printing device 1 determines whether the wireless communication tag 80 of the first label is valid using the first authentication data in the wireless communication tag 80 of the first label and the second authentication data in the wireless communication tag 80 of the second label. In other words, the printing device 1 can reliably determine whether the wireless communication tag 80 of a first label is valid through authentication using not just the wireless communication tag 80 on the first label, but authentication using wireless communication tags 80 on two labels (the first label and the second label). Thus, the printing device 1 can suppress unauthorized writing of information to wireless communication tags 80 provided on the tape 50.

The wireless communication writer 18 writes information to wireless communication tags 80 provided on labels 51 on the tape 50 fed by the tape feed motor 23. The CPU 71 permits the writing of information by the wireless communication writer 18 to the first label when determining that the authentication condition has been met (S9 of FIGS. 5, 8, and 10, S39 of FIG. 12, S63 of FIG. 14). In this way, the printing device 1 can suppress unauthorized writing of information to a wireless communication tag 80 that is not valid.

The second label is adjacent to the first label in the longitudinal direction of the tape 50. Accordingly, by performing authentication using wireless communication tags 80 on two neighboring labels (the first label and second label), the printing device 1 can quickly determine whether the wireless communication tag 80 on the first label is valid.

In the first embodiment, the CPU 71 determines that the authentication condition has been met when the first authentication data (B data in tag (N−1)) and second authentication data (A data in tag N) read by the wireless communication reader 16 are the same data (S7 of FIG. 5).

In the second embodiment, the CPU 71 determines that the authentication condition has been met when a calculated value is equivalent to a prescribed key value (S17 of FIG. 8). The calculated value is found by applying the first authentication data (B data in tag (N−1)) and second authentication data (A data in tag N) read by the wireless communication reader 16 to a prescribed formula (an addition expression). Specifically, the CPU 71 determines whether the calculated value is a key value using a key value (prescribed value) pre-stored in the ROM 72 of the printing device 1 (S17).

In the third embodiment, the CPU 71 determines that the authentication condition has been met when a calculated value is equivalent to a prescribed key value (S17 of FIG. 10). Here, the calculated value is found by applying the first authentication data (A data in tag (N−1)) and second authentication data (A data in tag N) read by the wireless communication reader 16 to a prescribed formula (a multiplication expression). In S3 the CPU 71 controls the wireless communication reader 16 to read the key value stored in the wireless communication tag 80 provided on the first label (B data in tag (N−1)). In S27 the CPU 71 determines whether the calculated value is the key value using the key value read in S3.

In the fourth embodiment, the CPU 71 determines that the authentication condition has been met when a calculated value is equivalent to a prescribed key value (S37 of FIG. 12). Here, the calculated value is found by applying the first authentication data (A data in tag (N+1)) and second authentication data (A data in tag N) read by the wireless communication reader 16 to a prescribed formula (a multiplication expression). In S33 the CPU 71 controls the wireless communication reader 16 to read the key value stored in the wireless communication tag 80 provided on the first label (B data in tag (N+1)). In S37 the CPU 71 determines whether the calculated value is the key value using the key value read in S35.

In the fifth embodiment, in S53 of FIG. 14, the CPU 71 controls the wireless communication reader 16 to read first authentication data (A data in tag (N+1), second authentication data (A data in tag N), and third authentication data (A data in tag N+2). The third authentication data is data stored in the wireless communication tag 80 provided on the third label that neighbors the first label in the longitudinal direction of the tape 50 on the side opposite the second label. In S61 the CPU 71 determines whether the first authentication data and second authentication data read by the wireless communication reader 16 satisfy a first authentication condition and whether the first authentication data and third authentication data read by the wireless communication reader 16 satisfy a second authentication condition. When both the first authentication condition and second authentication condition are met, in S63 the CPU 71 allows writing of information by the wireless communication writer 18 to the first label.

For example, the CPU 71 determines that the first authentication condition is met when a first calculated value (the first product X1) is equivalent to a prescribed first key value (S57, S61). The first calculated value is found by applying the first authentication data and second authentication data read by the wireless communication reader 16 to a prescribed formula (a multiplication expression). The CPU 71 determines that the second authentication condition is met when a second calculated value (the second product X2) is equivalent to a prescribed second key value (S57, S61). The second calculated value is found by applying the first authentication data and third authentication data read by the wireless communication reader 16 to a prescribed formula (a multiplication expression).

For example, in S53 of FIG. 14, the CPU 71 controls the wireless communication reader 16 to read a first key value stored in the wireless communication tag 80 provided on the first label (B data in tag (N+1)). In S61 the CPU 71 determines whether the first calculated value is the first key value using the first key value read in S53. Also in S53 the CPU 71 controls the wireless communication reader 16 to read a second key value stored in the wireless communication tag 80 provided on the first label (C data in tag (N+1)). In S61 the CPU 71 determines whether the second calculated value is the second key value using the second key value read in S53.

In the embodiments described above, the wireless communication tags 80 are examples of the storage element of the present disclosure. The tape feed motor 23 is an example of the supply portion of the present disclosure. The thermal head 10 is an example of the printing portion of the present disclosure. The wireless communication reader 16 is an example of the reading portion of the present disclosure. The wireless communication writer 18 is an example of the writing portion of the present disclosure. The CPU 71 is an example of the controller of the present disclosure. The ROM 52 is an example of the memory of the present disclosure. While the description has been made in detail with reference to specific embodiments, it would be apparent to those skilled in the art that various changes and modifications may be made thereto.

For example, any combination of the first through fifth embodiments may be implemented. The wireless communication tags 80 may also be storage elements using a wireless communication system different from RFID tags. The wireless communication reader 16 and wireless communication writer 18 may be a reader and writer that employ a wireless communication system different from RFID tags. The above-described embodiments describe a case in which one wireless communication tag 80 is provided on each label 51, but a plurality of wireless communication tags 80 may be provided on a single label 51. The labels 51 are also not limited to fixed-length labels, but may be variable in length.

In the first and second embodiments described above, the combinations of A data and B data stored in the plurality of wireless communication tags 80 are preferably all different from each other. In this case, the CPU 71 may determine in combination with the determinations in step S7 of FIG. 5 and step S17 of FIG. 8 whether A data hi tag (N−1) differs from the A data in tag N. If the A data in tag (N−1) is the same as the A data in tag N, the wireless communication tag 80 may be invalid. Accordingly, in S11 the CPU 71 may set the write permission flag for tag (N−1) stored in the flash memory 75 to "0".

In the third through fifth embodiments described above, the authentication data "0" functions as an end marker or a start marker. All other authentication data is preferably set to values other than "0". Therefore, in the third through fifth embodiments described above, the four digits to the right of the decimal for seconds in the manufacturing time, which are not realistically likely to be "0", are set as the A data, which is the basis for calculating all authentication data, Note that if the four digits to the right of the decimal place in seconds in the manufacturing time happen to be "0000", the A data may be set to a value obtained by adding a prescribed value ("1", for example) to this value.

In S109 of the tag writing process (see FIG. 6), the above-described embodiments describe a case in which A data and B data are modified by adding a prescribed value to each of the A data and B data. However, the prescribed value that is added to the A data and B data in S109 is arbitrary, provided that the A data and B data are modified. Further, the A data and B data may be modified through an arithmetic operation other than addition. Note that when a special value ("0" in the above-described embodiments) has a function such as an end marker or a start marker, the A data and B data are preferably modified in S109 through an arithmetic operation that does not change the A data and B data to the special value.

What is claimed is:

1. A printing device comprising:
    a supply portion configured to convey a tape in a longitudinal direction thereof, the tape including: a plurality of labels arranged continuously in the longitudinal direction, the plurality of labels including a first label and a second label; and a plurality of storage elements provided on respective ones of the plurality of labels, each of the plurality of storage elements being configured to store at least authentication data, the plurality of storage elements including a first storage element provided on the first label and a second storage element provided on the second label, the first storage element being configured to store first authentication data, the second storage element being configured to store second authentication data;
    a printing portion configured to print on the plurality of labels;
    a reading portion configured to read the authentication data from each of the plurality of storage elements; and
    a controller configured to perform:
        (a) reading the first authentication data from the first storage element and the second authentication data from the second storage element by the reading portion; and
        (b) determining whether the first authentication data is correlated to the second authentication data to meet an authentication condition.

2. The printing device according to claim 1, further comprising:
    a writing portion configured to write information to each of the plurality of storage elements,
    wherein the controller is configured to further perform:
        (c) permitting, in response to determining that the authentication condition is met, the writing portion to write information to the first storage element.

3. The printing device according to claim 1, wherein the second label neighbors the first label in the longitudinal direction.

4. The printing device according to claim 1, wherein in the (b) determining, the authentication condition requires that the first authentication data be equivalent to the second authentication data.

5. The printing device according to claim 1, wherein the (b) determining comprises:

(b1) calculating an authentication value by applying the first authentication data and the second authentication data to a prescribed formula; and (b2) determining whether the authentication value is equivalent to a prescribed key value.

6. The printing device according to claim 5, further comprising:
a memory configured to store the prescribed key value in advance,
wherein the (b2) determining determines whether the authentication value is equivalent to the prescribed key value stored in the memory.

7. The printing device according to claim 5, wherein the (b) determining further comprises:
(b3) reading the prescribed key value stored in the first storage element by the reading portion, and
wherein the (b2) determining determines whether the authentication value is equivalent to the prescribed key value read from the first storage element.

8. The printing device according to claim 2, wherein the plurality of labels further includes a third label neighboring the first label on an opposite side of the second label in the longitudinal direction, and the plurality of storage elements includes a third storage element provided on the third label and configured to store third authentication data,
wherein the (a) reading further reads the third authentication data from the third storage element by the reading portion,
wherein the (b) determining determines whether the first authentication data is correlated to the second authentication data to meet a first authentication condition and is correlated to the third authentication data to meet a second authentication condition, and
wherein the (c) permitting permits the writing portion to write information to the first storage element in response to determining that both the first authentication condition and the second authentication condition are met.

9. The printing device according to claim 8, wherein the (b) determining comprises:
(b4) calculating a first authentication value by applying the first authentication data and the second authentication data to a first formula;
(b5) determining whether the first authentication value is equivalent to a first key value;
(b6) calculating a second authentication value by applying the first authentication data and the third authentication data to a second formula; and
(b7) determining whether the second authentication value is equivalent to a second key value.

10. The printing device according to claim 9, wherein the (b) determining further comprises:
(b8) reading the first key value and the second key value stored in the first storage element by the reading portion, and
wherein the (b5) determining determines whether the first authentication value is equivalent to the first key value read from the first storage element, and the (b7) determining determines whether the second authentication value is equivalent to the second key value read from the first storage element.

11. A tape comprising:
a plurality of labels arranged continuously in a longitudinal direction, the plurality of labels including a first label and a second label neighboring the first label in the longitudinal direction; and
a plurality of storage elements provided on respective ones of the plurality of labels, each of the plurality of storage elements being provided with a first storage area and a second storage area, the first storage area storing first data in advance, the second storage area storing second data in advance, the plurality of storage elements including a first storage element provided on the first label and a second storage element provided on the second label,
wherein the second data stored in the first storage element is equivalent to the first data stored in the second storage element.

12. The tape according to claim 11, wherein the plurality of labels further includes a third label neighboring the first label on an opposite side of the second label in the longitudinal direction, and the plurality of storage elements includes a third storage element provided on the third label, and
wherein the first data stored in the first storage element is equivalent to the second data stored in the third storage element.

13. A tape comprising:
a plurality of labels arranged continuously in a longitudinal direction, the plurality of labels including a first label, a second label, and a third label, the second label neighboring the first label in the longitudinal direction, the third label neighboring the first label on an opposite side of the second label in the longitudinal direction; and
a plurality of storage elements provided on respective ones of the plurality of labels, each of the plurality of storage elements being provided with a first storage area and a second storage area, the first storage area being configured to store first data in advance, the second storage area being configured to store second data in advance, the plurality of storage elements including a first storage element, a second storage element, and a third storage element, the first storage element being provided on the first label, the second storage element being provided on the second label, the third storage element being provided on the third label,
wherein a first sequence of digits forms a first total value of the second data stored in the first storage element and the first data stored in the second storage element, and a second sequence of digits forms a second total value of the first data stored in the first storage element and the second data stored in the third storage element, at least part of the first sequence of digits being identical to at least part of the second sequence of digits.

* * * * *